(12) United States Patent
Gunji et al.

(10) Patent No.: US 8,790,204 B2
(45) Date of Patent: Jul. 29, 2014

(54) IN-WHEEL MOTOR

(75) Inventors: Daisuke Gunji, Fujisawa (JP); Yasuyuki Matsuda, Fujisawa (JP); Shuhei Souma, Fujisawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 13/824,638

(22) PCT Filed: Jul. 27, 2012

(86) PCT No.: PCT/JP2012/069174
§ 371 (c)(1),
(2), (4) Date: May 22, 2013

(87) PCT Pub. No.: WO2013/128671
PCT Pub. Date: Sep. 6, 2013

(65) Prior Publication Data
US 2013/0267365 A1    Oct. 10, 2013

(30) Foreign Application Priority Data

Feb. 29, 2012   (JP) .................................. 2012-043394
Apr. 20, 2012   (JP) .................................. 2012-096527

(51) Int. Cl.
*F16H 3/72*   (2006.01)
(52) U.S. Cl.
USPC .............................................. 475/5; 180/372
(58) Field of Classification Search
None
See application file for complete search history.

(56) References Cited

U.S. PATENT DOCUMENTS

2005/0140230 A1   6/2005   Johnson et al.
2012/0309576 A1   12/2012  Kato et al.

FOREIGN PATENT DOCUMENTS

| JP | 2001-32888 A | 2/2001 |
| JP | 2005-81932 A | 3/2005 |
| JP | 2005-517373 A | 6/2005 |
| JP | 2006-15785 A | 1/2006 |
| WO | 2011/102392 A1 | 8/2011 |

OTHER PUBLICATIONS

International Search Report of PCT/JP2012/069174, dated Sep. 18, 2012.

*Primary Examiner* — Erin D Bishop
(74) *Attorney, Agent, or Firm* — Sughrue Mion, PLLC

(57) ABSTRACT

There is provided an in-wheel motor that can reduce the loss of energy. An electric vehicle driving device includes a first motor, a second motor, a speed change mechanism, a speed reducing mechanism, and a clutch device. A first planetary gear mechanism of the speed change mechanism is a single-pinion type planetary gear device. A second planetary gear mechanism of the speed change mechanism is a double-pinion type planetary gear device. The electric vehicle driving device operates so as to switch a first speed change state where the magnitudes of rotational forces of the first motor and the second motor are equal to each other and the directions of the rotational forces are opposite to each other, and a second speed change state where the rotational forces have the same magnitude and direction.

6 Claims, 15 Drawing Sheets

IN-WHEEL MOTOR

CROSS REFERENCE TO RELATED APPLICATIONS

This is a National Stage of International Application No. PCT/JP2012/069174 filed Jul. 27, 2012, claiming priority based on Japanese Patent Application Nos. 2012-043394 filed 2012-Feb. 29, 2012 and 2012-096527, filed Apr. 20, 2012, the contents of all which are incorporated herein by reference in their entirety.

FIELD

The present invention relates to an in-wheel motor that drives an electric vehicle.

BACKGROUND

Among electric vehicle driving devices, particularly, an electric vehicle driving device, which directly drives a wheel, is referred to as an in-wheel motor. Here, the in-wheel motor is a driving device that is provided near a wheel of an electric vehicle. The in-wheel motor needs to be disposed in the wheel or near the wheel. However, a relatively small space is formed in the wheel or near the wheel. Accordingly, the size of the in-wheel motor is required to be reduced.

As in-wheel motors, there are an in-wheel motor that includes a speed reducing mechanism and a direct drive type in-wheel motor that does not include a speed reducing mechanism. The in-wheel motor including the speed reducing mechanism easily ensures a rotational force, which is enough to drive an electric vehicle, when the electric vehicle starts or climbs a hill (goes up a hill). However, since the in-wheel motor including the speed reducing mechanism transmits a rotational force to a wheel through the speed reducing mechanism, the friction loss of the speed reducing mechanism occurs. The rotational speed of an output shaft of the in-wheel motor, which includes the speed reducing mechanism, is always higher than the rotational speed of the wheel. Accordingly, in the case of the in-wheel motor including the speed reducing mechanism, the loss of energy is increased by the friction loss of the speed reducing mechanism, particularly, when an electric vehicle travels at a high speed.

Meanwhile, since the direct drive type in-wheel motor transmits a rotational force to a wheel without a speed reducing mechanism, the direct drive type in-wheel motor can reduce the loss of energy. However, the direct drive type in-wheel motor cannot amplify a rotational force by the speed reducing mechanism. Accordingly, it is difficult for the direct drive type in-wheel motor to ensure a rotational force, which is enough to drive an electric vehicle, when the electric vehicle starts or climbs a hill. As a technique that ensures a rotational force enough to drive an electric vehicle, a technique, which is not an in-wheel motor but includes a speed reducing mechanism including a planetary gear mechanism and two motors, is disclosed in, for example, Patent Literature 1.

CITATION LIST

Patent Literature

Patent Literature 1: Japanese Laid-open Patent Publication No. 2005-081932

SUMMARY

Technical Problem

The technique disclosed in Patent Literature 1 includes a power circulation path. The technique disclosed in Patent Literature 1 converts a rotational force into electric power in the power circulation path first, and converts the electric power into a rotational force again. Accordingly, the technique disclosed in Patent Literature 1 needs to include a generator and a motor on the power circulation path. However, since the size of the electric vehicle driving device is required to be reduced as described above, it is difficult for the in-wheel motor to secure a space, which is used for the installation of the generator and the motor, near the wheel. Moreover, the technique disclosed in Patent Literature 1 converts power into electric power and further converts electric power into power. For this reason, the loss of energy occurs during the conversion of energy in the technique disclosed in Patent Literature 1.

An object of the invention is to provide an in-wheel motor that can reduce the loss of energy.

Solution to Problem

According to an aspect of the present invention, there is provided an in-wheel motor including: a first motor; a second motor; a first sun gear connected to the first motor; a first pinion gear that meshes with the first sun gear; a first carrier for holding the first pinion gear so that the first pinion gear rotates and the first pinion gear revolves around the first sun gear; a clutch device for restricting the rotation of the first carrier in both directions; a first ring gear that meshes with the first pinion gear and is connected to the second motor; a second sun gear connected to the first motor; a second pinion gear that meshes with the second sun gear; a third pinion gear that meshes with the second pinion gear; a second carrier for holding the second and third pinion gears so that the respective second and third pinion gears rotate and the second and third pinion gears revolve around the second sun gear, the second carrier being connected to the first ring gear; and a second ring gear that meshes with the third pinion gear, wherein the in-wheel motor operates so as to switch between a first speed change state and a second speed change state, in the first speed change state, the rotation directions of the first and second sun gears are opposite to a direction in which the first carrier of which the rotation direction is restricted by the clutch device is to rotate and absolute values of rotational speeds of the first and second sun gears are larger than an absolute value of the rotational speed of the first carrier of which the rotation direction is restricted by the clutch device, and in the second speed change state, the rotation directions of the first and second sun gears are the same as the rotation direction of the first carrier.

This in-wheel motor can achieve two speed change states, that is, the first and second speed change states by the above-mentioned structure. In the first speed change state, the first and second motors operate and the clutch device is in an engagement state. In the first speed change state, a part of a rotational force returns to the first ring gear from the second carrier and the rotational force transmitted to the first ring gear is further transmitted to the second sun gear through the first sun gear in this in-wheel motor. That is, a rotational force is circulated in this in-wheel motor. By this structure, the in-wheel motor can achieve a higher transmission gear ratio. That is, this in-wheel motor can transmit a rotational force, which is larger than the rotational force output from the first motor, to the wheel in the first speed change state.

In the second speed change state, the first and second motors operate and the clutch device is in a disengagement state. In the second speed change state, the in-wheel motor can continuously change a transmission gear ratio by changing the angular speed of the second motor. In this case, since this in-wheel motor can reduce a difference between the angular speed of the first motor and the angular speed of the second ring gear serving as an output shaft, the in-wheel motor can reduce friction loss. As a result, the in-wheel motor can reduce the loss of energy.

Further, since both the first and second motors of this in-wheel motor operate in the first speed change state, it is possible to effectively use both the first and second motors. Furthermore, since this in-wheel motor can obtain power from both the first and second motors in the first speed change state, it is possible to reduce an output per motor when obtaining necessary power. For this reason, it is not necessary to use a motor of which an output is absurdly large, and it is easy to make the first and second motors operate in an area where the efficiency of a motor is high. As a result, this in-wheel motor can reduce the loss of energy.

Moreover, since this in-wheel motor does not include a generator and a motor on a power circulation path, this in-wheel motor can achieve a reduction in size. Further, this in-wheel motor switches the first and second speed change states by a so-called two-way clutch device, which can restrict the rotation of the first carrier in both directions, as the clutch device. Accordingly, this in-wheel motor can change speed in both the forward and backward directions. Furthermore, since the two-way clutch device is passively operated by the rotation of the first motor, the two-way clutch device does not require an actuator in the speed change operation of the in-wheel motor. As a result, it is possible to reduce the number of parts of the in-wheel motor and to achieve the reduction of the size of the in-wheel motor.

It is preferable that the in-wheel motor according to the present invention, further including: a speed reducing mechanism including: a third sun gear connected to the second ring gear; a fourth pinion gear that meshes with the third sun gear, a third carrier for holding the fourth pinion gear so that the fourth pinion gear rotates and the fourth pinion gear revolves around the third sun gear, the third carrier being connected to a vehicle wheel of an electric vehicle; and a third ring gear that meshes with the fourth pinion gear and is fixed to a static system. According to this, since it is possible to amplify the rotational forces of the first and second motors by the speed reducing mechanism, it is possible to reduce rotational forces that are required for the first and second motors. As a result, since it is possible to reduce the sizes and weights of the first and second motors, it is possible to reduce the size and weight of this in-wheel motor.

According to the present invention, it is preferable that the clutch device includes: an outer member that is fixed to a static system; an inner member that is connected to the first carrier; a plurality of rollers; and a holder for holding the plurality of rollers, and wherein a frictional engagement member of the holder is engaged with an input portion for the first sun gear, the second sun gear, or a rotor of the first motor and the relative phase of the holder relative to the inner member is changed by a friction force generated by the frictional engagement member, so that the clutch device switches the allowance and restriction of the rotation of the first carrier. According to this, the first speed change state may correspond to a so-called low gear and the second speed change state may correspond to a so-called high gear.

In the aspect of the invention, it is preferable that the clutch device switch the restriction and allowance of the rotation of the first carrier based on the rotation of the first and second sun gears. Since the first and second speed change states are switched by a so-called two-way clutch device as described above, speed can be changed in both the forward and backward directions.

According to an another aspect of the present invention, there is provided an in-wheel motor including: a first motor; a second motor; a first sun gear connected to the first motor; a first pinion gear that meshes with the first sun gear; a first carrier for holding the first pinion gear so that the first pinion gear rotates and the first pinion gear revolves around the first sun gear; a first ring gear that meshes with the first pinion gear; a second sun gear connected to the first motor; a second pinion gear that meshes with the second sun gear; a third pinion gear that meshes with the second pinion gear; a second carrier for holding the second and third pinion gears so that the respective second and third pinion gears rotate and the second and third pinion gears revolve around the second sun gear; a clutch device for restricting the rotation of the second carrier in both directions; and a second ring gear that meshes with the third pinion gear, is connected to the first carrier, and is connected to the second motor, wherein the in-wheel motor operates so as to switch between a first speed change state and a second speed change state, in the first speed change state, the rotation directions of the first and second sun gears are opposite to a direction in which the second carrier of which the rotation direction is restricted by the clutch device is to rotate and absolute values of rotational speeds of the first and second sun gears are larger than an absolute value of the rotational speed of the second carrier of which the rotation direction is restricted by the clutch device, and in the second speed change state, the rotation directions of the first and second sun gears are the same as the rotation direction of the second carrier.

This in-wheel motor can achieve two speed change states, that is, the first and second speed change states by the above-mentioned structure. In the first speed change state, the first and second motors operate and the clutch device is in an engagement state. In the first speed change state, a part of a rotational force returns to the first ring gear from the second carrier and the rotational force transmitted to the first ring gear is further transmitted to the second sun gear through the first sun gear in this in-wheel motor. That is, a rotational force is circulated in this in-wheel motor. By this structure, the in-wheel motor can achieve a higher transmission gear ratio. That is, this in-wheel motor can transmit a rotational force, which is larger than the rotational force output from the first motor, to the wheel in the first speed change state.

In the second speed change state, the first and second motors operate and the clutch device is in a disengagement state. In the second speed change state, the in-wheel motor can continuously change a transmission gear ratio by changing the angular speed of the second motor. In this case, since this in-wheel motor can reduce a difference between the angular speed of the first motor and the angular speed of the second ring gear serving as an output shaft, the in-wheel motor can reduce friction loss. As a result, the in-wheel motor can reduce the loss of energy.

Further, since both the first and second motors of this in-wheel motor operate in the first speed change state, it is possible to effectively use both the first and second motors. Furthermore, since this in-wheel motor can obtain power from both the first and second motors in the first speed change state, it is possible to reduce an output per motor when obtaining necessary power. For this reason, it is not necessary to use a motor of which an output is absurdly large, and it is easy to make the first and second motors operate in an area where the efficiency of a motor is high. As a result, this in-wheel motor can reduce the loss of energy.

Moreover, since this in-wheel motor does not include a generator and a motor on a power circulation path, this in-wheel motor can achieve a reduction in size. Further, this in-wheel motor switches the first and second speed change states by a so-called two-way clutch device, which can restrict the rotation of the second carrier in both directions, as the clutch device. Accordingly, this in-wheel motor can change speed in both the forward and backward directions. Furthermore, since the two-way clutch device is passively operated by the rotation of the first motor, the two-way clutch device does not require an actuator in the speed change operation of the in-wheel motor. As a result, it is possible to reduce the number of parts of the in-wheel motor and to achieve the reduction of the size of the in-wheel motor.

In the another aspect according to the present invention, it is preferable that the in-wheel motor further includes: a speed reducing mechanism including: a third sun gear connected to the first ring gear, a fourth pinion gear that meshes with the third sun gear, a third carrier for holding the fourth pinion gear so that the fourth pinion gear rotates and the fourth pinion gear revolves around the third sun gear, and is connected to a vehicle wheel of an electric vehicle; and a third ring gear that meshes with the fourth pinion gear and is fixed to a static system. According to this, since it is possible to amplify the rotational forces of the first and second motors by the speed reducing mechanism that includes the third sun gear, the fourth pinion gear, the third carrier, and the third ring gear, it is possible to reduce rotational forces that are required for the first and second motors. As a result, since it is possible to reduce the sizes and weights of the first and second motors, it is possible to reduce the size and weight of this in-wheel motor.

It is preferable that the clutch device includes: an outer member fixed to a static system; an inner member connected to the second carrier, a plurality of rollers; and a holder for holding the plurality of rollers, and wherein a frictional engagement member of the holder is engaged with an input portion for the second ring gear, the first carrier, or a rotor of the second motor and the relative phase of the holder relative to the inner member is changed by a friction force generated by the frictional engagement member, so that the clutch device switches the allowance and restriction of the rotation of the second carrier. According to this, the first speed change state may correspond to a so-called low gear state and the second speed change state may correspond to a so-called high gear.

It is preferable that the clutch device switch the restriction and allowance of the rotation of the second carrier based on the rotation of the second ring gear and the first carrier. Since the first and second speed change states are switched by a so-called two-way clutch device as described above, speed can be changed in both the forward and backward directions.

It is preferable that the clutch device is provided with a permanent magnet on the frictional engagement member, and the frictional engagement member is engaged with the input portion by a magnetic attraction force of the permanent magnet that acts on the input portion formed of a magnetic body. Since the magnetic force of the permanent magnet has high stability against secular change, a stable pressing force is obtained. Accordingly, it is possible to make the frictional engagement member be stably engaged with the input portion.

According to the present invention, it is preferable when a planetary ratio of a double-pinion planetary gear device, which includes the second sun gear, the second pinion gear, the third pinion gear, the second carrier, and the second ring gear, is denoted by $\alpha$ and a planetary ratio of a single-pinion planetary gear device, which includes the first sun gear, the first pinion gear, the first carrier, and the first ring gear, is denoted by $\beta$, "$1.90 \leq \alpha \leq 2.10$" and "$2.80 \leq \beta \leq 3.20$" are satisfied. According to this, since it is possible to achieve an interstage ratio of 2 between the first and second speed change states, it is possible to provide an in-wheel motor that is suitable for an electric vehicle.

Advantageous Effects of Invention

The invention can provide an in-wheel motor that can reduce the loss of energy.

DESCRIPTION OF EMBODIMENTS

Embodiments of the invention will be described in detail with reference to the drawings.

Figure 1:
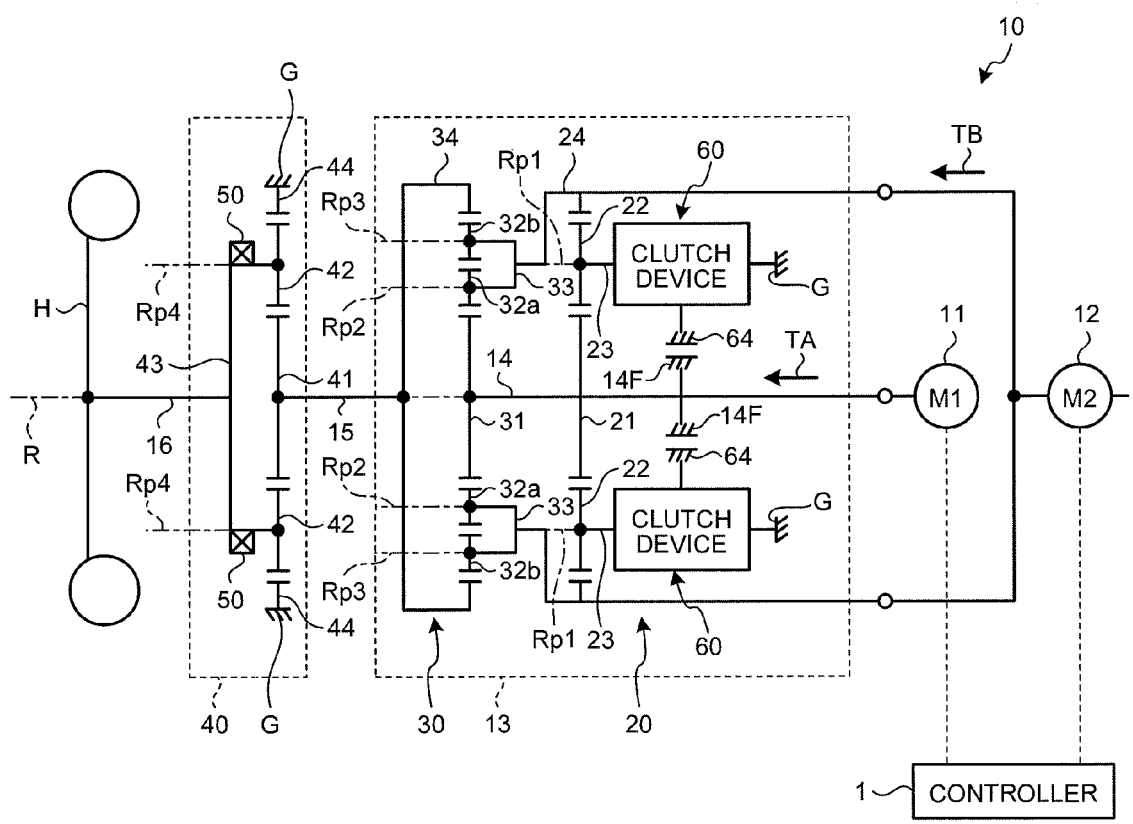
FIG. 1 is a view illustrating the configuration of an electric vehicle driving device of this embodiment.

FIG. 1 is a view illustrating the configuration of an electric vehicle driving device of this embodiment. An electric vehicle driving device 10, which is an in-wheel motor, includes a casing G, a first motor 11, a second motor 12, a speed change mechanism 13, a speed reducing mechanism 40, and a wheel bearing 50. Meanwhile, the in-wheel motor may not necessarily be received in a wheel. The casing G receives the first motor 11, the second motor 12, the speed change mechanism 13, and the speed reducing mechanism 40.

The first motor 11 can output a first rotational force TA. The second motor 12 can output a second rotational force TB. The speed change mechanism 13 is connected to the first motor 11. By this structure, the first rotational force TA is transmitted (input) to the speed change mechanism 13 from the first motor 11 when the first motor 11 operates. Further, the speed change mechanism 13 is connected to the second motor 12. By this structure, the second rotational force TB is transmitted (input) to the speed change mechanism 13 when the second motor 12 operates. The operation of the motor described herein means that electric power is supplied to the first motor 11 (second motor 12) and an input/output shaft of the first motor 11 (second motor 12) rotates.

The speed change mechanism 13 can change a speed reduction ratio (a ratio $\omega i/\omega o$ of an input rotational speed $\omega i$ of the speed change mechanism 13 to an output rotational speed $\omega o$). The speed change mechanism 13 includes a first planetary gear mechanism 20, a second planetary gear mechanism 30, and a clutch device 60. The first planetary gear mechanism 20 is a single-pinion type planetary gear mechanism. The first planetary gear mechanism 20 includes a first sun gear 21, first pinion gears 22, first carriers 23, and a first ring gear 24. The second planetary gear mechanism 30 is a double-pinion type planetary gear mechanism. The second planetary gear mechanism 30 includes a second sun gear 31, second pinion gears 32a, third pinion gears 32b, second carriers 33, and a second ring gear 34.

The first sun gear 21 is supported in the casing G so as to be rotatable about a rotation axis R. The first sun gear 21 is connected to the first motor 11. By this structure, the first rotational force TA is transmitted to the first sun gear 21 when the first motor 11 operates. Further, the first sun gear 21 rotates about the rotation axis R when the first motor 11 operates. The first pinion gears 22 mesh with the first sun gear 21. The first carriers 23 hold the first pinion gears 22 so that the first pinion gears 22 can rotate about first pinion rotation axes Rp1. The first pinion rotation axes Rp1 are parallel to, for example, the rotation axis R.

The first carriers 23 are supported in the casing G so as to be rotatable about the rotation axis R. By this structure, the first carriers 23 hold the first pinion gears 22 so that the first pinion gears 22 can revolve around the first sun gear 21, that is, the rotation axis R. The first ring gear 24 can rotate about the rotation axis R. The first ring gear 24 meshes with the first pinion gears 22. Further, the first ring gear 24 is connected to the second motor 12. By this structure, the second rotational force TB is transmitted to the first ring gear 24 when the second motor 12 operates. Furthermore, when the second motor 12 operates, the first ring gear 24 rotates about the rotation axis R.

The clutch device 60 is disposed between the casing G and the first carrier 23. The clutch device 60 can restrict the rotation of the first carrier 23 in both directions. Specifically, the clutch device 60 can switch a case where the clutch device 60 restricts (brakes) the rotation of the first carrier 23 about the rotation axis R and a case where the clutch device 60 allows the rotation. Hereinafter, a state where the clutch device 60 restricts (brakes) the rotation is referred to as an engagement state, and a state where the clutch device 60 allows the rotation is referred to as a disengagement state. The clutch device 60 is a so-called two-way clutch device that can switch the engagement state and the disengagement state in both the rotation directions of the first carrier 23.

The clutch device 60 is connected to a sun gear shaft 14 on which the first and second sun gears 21 and 31 are mounted with frictional engagement members (clutch-side frictional engagement members) 64 interposed therebetween. A portion of the sun gear shaft 14, which comes into contact with the clutch-side frictional engagement members 64, is a sun gear-side frictional engagement portion 14F. By this structure, the clutch device 60 can switch the engagement state (the restriction of the rotation) and the disengagement state (the allowance of the rotation) of the first carrier 23 based on the rotation of the first and second sun gears 21 and 31. Processing (surface roughening, knurling, or the like), which improves a friction force between the sun gear-side frictional engagement portion 14F and the clutch-side frictional engagement members 64, may be performed on the surface of the sun gear shaft 14, and a frictional member may be mounted on the sun gear shaft 14. In this way, the first carrier 23 can be engaged with and disengaged from the casing G by the clutch device 60. That is, the clutch device 60 can allow the first carrier 23 to rotate relative to the casing G or can allow the first carrier 23 not to rotate relative to the casing G.

The second sun gear 31 is supported in the casing G so as to be rotatable about the rotation axis R. The second sun gear 31 is connected to the first motor 11 through the first sun gear 21. Specifically, the respective first and second sun gears 21 and 31 are formed integrally with the sun gear shaft 14 so as to be rotatable about the same axis (rotation axis R). Further, the sun gear shaft 14 is connected to the first motor 11. By this structure, the second sun gear 31 rotates about the rotation axis R when the first motor 11 operates.

The second pinion gears 32a mesh with the second sun gear 31. The third pinion gears 32b mesh with the second pinion gears 32a. The second carriers 33 hold the second pinion gears 32a so that the second pinion gears 32a can rotate about second pinion rotation axes Rp2. Further, the second carriers 33 hold the third pinion gears 32b so that the third pinion gears 32b can rotate about third pinion rotation axes Rp3. The second pinion rotation axes Rp2 and the third pinion rotation axes Rp3 are parallel to, for example, the rotation axis R.

The second carriers 33 are supported in the casing G so as to be rotatable about the rotation axis R. By this structure, the second carriers 33 hold the second and third pinion gears 32a and 32b so that the second and third pinion gears 32a and 32b can revolve around the second sun gear 31, that is, the rotation axis R. Further, the second carriers 33 are connected to the first ring gear 24. By this structure, the second carriers 33 rotate about rotation axis R when the first ring gear 24 rotates. The second ring gear 34 can rotate about the rotation axis R. The second ring gear 34 meshes with the third pinion gears 32b. Furthermore, the second ring gear 34 is connected to an input/output shaft (speed change mechanism-input/output shaft) 15 of the speed change mechanism 13. By this structure, the speed change mechanism-input/output shaft 15 rotates when the second ring gear 34 rotates.

The speed reducing mechanism 40 is disposed between the speed change mechanism 13 and a vehicle wheel H of an electric vehicle. Moreover, the speed reducing mechanism 40 reduces the rotational speed of the speed change mechanism-input/output shaft 15 and outputs the reduced rotational speed to an input/output shaft (speed reducing mechanism-input/output shaft) 16. The speed reducing mechanism-input/output shaft 16 is connected to the vehicle wheel H of the electric vehicle, and transmits power between the speed reducing mechanism 40 and the vehicle wheel H. By this structure, power generated from at least one of the first and second motors 11 and 12 is transmitted to the vehicle wheel H through the speed change mechanism 13 and the speed reducing mechanism 40 and drives the vehicle wheel H. Further, an input from the vehicle wheel H is transmitted to at least one of the first and second motors 11 and 12 through the speed reducing mechanism 40 and the speed change mechanism 13. In this case, at least one of the first and second motors 11 and 12 is driven by the vehicle wheel H and can generate electric power (regeneration).

The speed reducing mechanism 40 includes a third sun gear 41, fourth pinion gears 42, a third carrier 43, and a third ring gear 44. The speed change mechanism-input/output shaft 15 is mounted on the third sun gear 41. By this structure, the third sun gear 41 and the second ring gear 34 of the speed change mechanism 13 are connected to each other by the speed change mechanism-input/output shaft 15. The fourth pinion gears 42 mesh with the third sun gear 41. The third carrier 43 holds the fourth pinion gears 42 so that the fourth pinion gears 42 can rotate about the fourth pinion rotation axes Rp4 and the fourth pinion gears 42 can revolve around the third sun gear 41. The third ring gear 44 meshes with the fourth pinion gears 42 and is fixed to a static system (the casing G in this embodiment). The third carrier 43 is connected to the vehicle wheel H by the speed reducing mechanism-input/output shaft 16. Further, the third carrier 43 is rotatably supported by the wheel bearing 50.

The electric vehicle driving device 10 reduces the rotational speed of the speed change mechanism-input/output shaft 15 of the speed change mechanism 13 with the speed reducing mechanism 40 interposed between the speed change mechanism 13 and the vehicle wheel H, and drives the vehicle wheel H. For this reason, even though the maximum rotational forces of the first and second motors 11 and 12 are small, it is possible to obtain a driving force that is required for the electric vehicle. As a result, it is possible to reduce the driving currents of the first and second motors 11 and 12 and to reduce the sizes and weights of the first and second motors 11 and 12. Further, it is possible to reduce the manufacturing cost and weight of the electric vehicle driving device 10.

A controller 1 controls the operation of the electric vehicle driving device 10. More specifically, the controller 1 controls the rotational speeds, the rotation directions, and the outputs of the first and second motors 11 and 12. The controller 1 is, for example, a microcomputer. Next, the structure of the clutch device 60 will be described.

Figure 2:
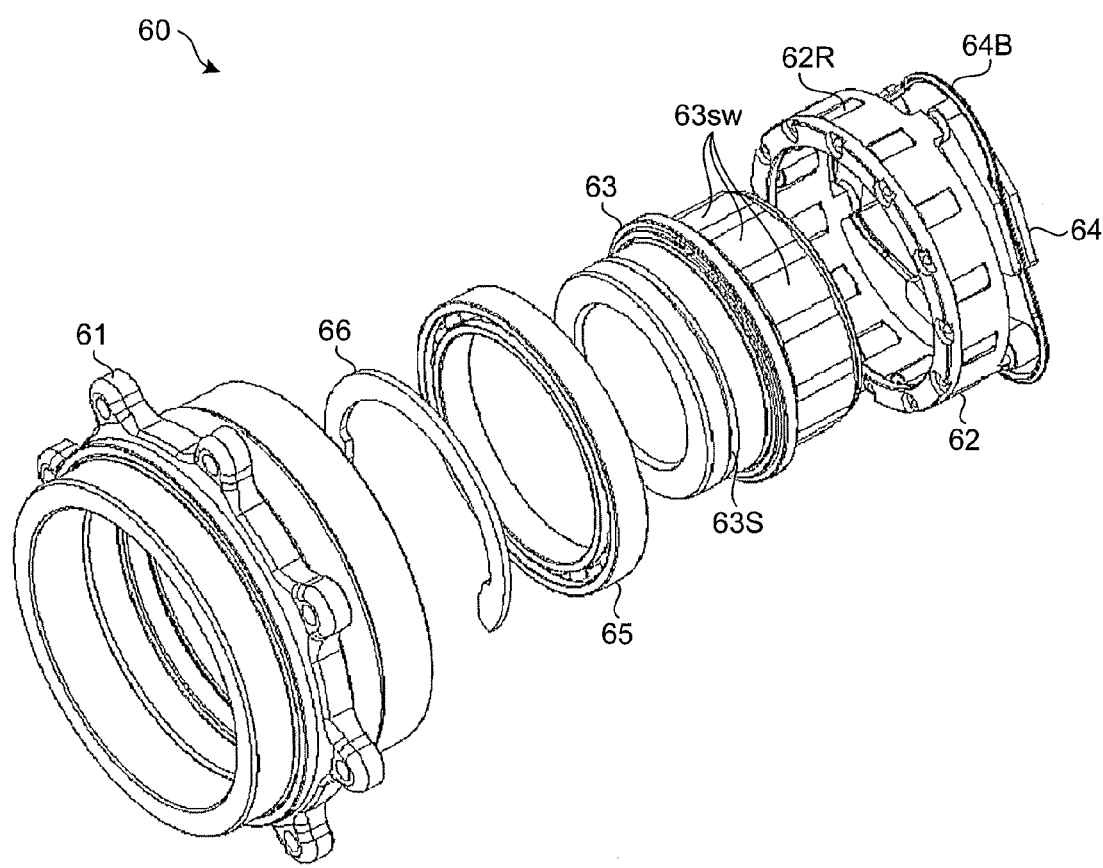
FIG. 2 is an exploded perspective view of a clutch device of the electric vehicle driving device according to this embodiment.
Figure 3:
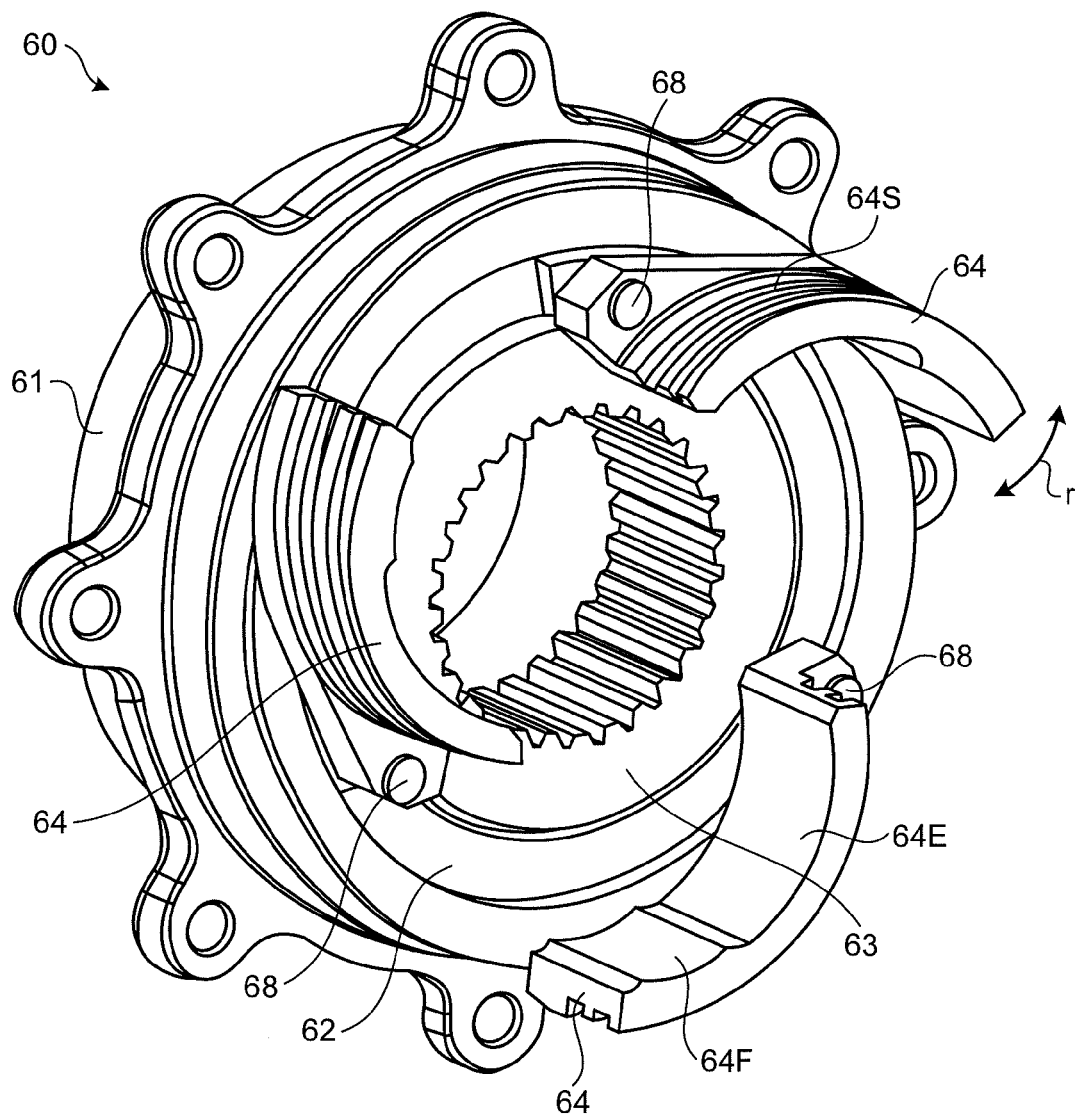
FIG. 3 is a perspective view of the clutch device illustrated in FIG. 2.

FIG. 2 is an exploded perspective view of the clutch device of the electric vehicle driving device according to this embodiment. FIG. 3 is a perspective view of the clutch device illustrated in FIG. 2. The clutch device 60 includes an outer member 61, a holder 62, a roller 62R, an inner member 63, clutch-side frictional engagement members 64, and a spring 64B as a pressing member. In addition to this, the clutch device 60 includes a bearing 65 and a snap ring 66.

All of the outer member 61, the holder 62, and the inner member 63 are cylindrical members. The holder 62 is disposed inside the outer member 61 in the radial direction, and the inner member 63 is disposed inside the holder 62 in the radial direction. The holder 62 holds a plurality of rollers 62R in a plurality of holding grooves that are formed in the direction parallel to the central axis. The plurality of rollers 62R are disposed at regular intervals in the circumferential direction of the holder 62. The rollers 62R are columnar members. The holder 62, which holds the plurality of rollers 62R, is disposed between the outer member 61 and the inner member 63.

The inner member 63 includes a plurality of flat surfaces (cam faces) 63$sw$ at a portion thereof facing the holder 62. The respective cam faces 63$sw$ face the respective rollers 62R and come into contact with the rollers 62R while the inner member 63 is mounted on the holder 62 that holds the plurality of rollers 62R. The bearing 65 is mounted on the inner member 63. When an inner race of the bearing 65 is mounted on the inner member 63, a snap ring 66 is fitted to a groove 63S formed on the inner member 63 in order to avoid the separation of the bearing 65 from the inner member 63. When the inner member 63 is disposed inside the outer member 61 in the radial direction together with the holder 62, an outer race of the bearing 65 is mounted on the inner peripheral portion of the outer member 61. By this structure, the bearing 65 supports the outer and inner members 61 and 63 so that the outer and inner members 61 and 63 can rotate relative to each other.

In this embodiment, the outer member 61 is fixed to the casing G, which is illustrated in FIG. 1, of the electric vehicle driving device 10. In this way, the outer member 61 is fixed to the static system. The inner member 63 is mounted on the first carrier 23 illustrated in FIG. 1. The holder 62 is connected to the sun gear shaft 14 through the clutch-side frictional engagement members 64 and the sun gear-side frictional engagement portion 14F illustrated in FIG. 1. As illustrated in FIG. 3, the holder 62 of the clutch device 60 includes the plurality of (three in this embodiment) clutch-side frictional engagement members 64. The clutch-side frictional engagement members 64 are members having an arcuate cross-section.

The plurality of clutch-side frictional engagement members 64 are disposed in the circumferential direction of the holder 62. One end portion of each of the clutch-side frictional engagement members 64 is mounted on the holder 62 by a pin 68. The clutch-side frictional engagement member 64 can swing about the pin 68 relative to the holder 62 (in the direction illustrated by an arrow r of FIG. 3). The spring 64B illustrated in FIG. 2 is fitted to grooves 64S that are formed on the outer peripheral portions of the clutch-side frictional engagement members 64. In this embodiment, the spring 64B is a coil spring made of, for example, spring steel, is fitted to the grooves 64S of the plurality of clutch-side frictional engagement members 64, and is wound around the outer peripheral portions of the plurality of clutch-side frictional engagement members 64.

The clutch-side frictional engagement member 64 includes a friction surface 64F at the other end portion thereof, that is, on the side opposite to the pin 68. An escape portion 64E is formed between the friction surface 64F and the pin 68. The surface of the escape portion 64E is positioned closer to the grooves 64S than the friction surface 64F. The sun gear shaft 14 illustrated in FIG. 1 is disposed on the inner side of the plurality of clutch-side frictional engagement members 64 (which correspond to the inside of the holder 62 in the radial direction). The sun gear-side frictional engagement portion 14F, which is illustrated in FIG. 1, of the sun gear shaft 14 faces the friction surfaces 64F of the plurality of clutch-side frictional engagement members 64 and comes into contact with the friction surfaces 64F. The friction surfaces 64F of the plurality of clutch-side frictional engagement members 64 are pressed against the sun gear-side frictional engagement portion 14F by the tension of the spring 64B that is wound around the outer peripheral portions of the clutch-side frictional engagement members 64. The holder 62 is rotated about the central axis thereof (which is the same as the rotation axis R of the sun gear shaft 14 or the like illustrated in FIG. 1) by a friction force that is generated between the friction surfaces 64F of the clutch-side frictional engagement members 64 and the sun gear-side frictional engagement portion 14F of the sun gear shaft 14. Further, the relative phase of the holder 62 relative to the inner member 63 is changed. The engagement state and the disengagement state of the clutch device 60 are switched by the operation of the holder 62. In this embodiment, when a difference between the rotational speed of the sun gear shaft 14 and the rotational speed of the holder 62 is generated, the clutch-side frictional engagement members 64 generate a friction force caused by a difference in the rotational speed and generate torque for rotating the holder 62.

Since the clutch-side frictional engagement member 64 includes the friction surface 64F on the side opposite to the pin 68 in this embodiment, large moment is generated at the position of the friction surface 64F by the pressing force of the spring 64B. In this case, it is possible to reduce the influence of the friction that is generated between the pin 68 and the clutch-side frictional engagement member 64. For this reason, since the friction surface 64F can compensate its own wear amount, the clutch device 60 easily keeps a friction force, which is generated between the friction surfaces 64F and the sun gear-side frictional engagement portion 14F, at a constant value. As a result, since the clutch-side frictional engagement members 64 can grip the sun gear shaft 14 with a constant gripping force, it is possible to stably and reliably switch the engagement state and the disengagement state of the clutch device 60 by making the holder 62 stably and reliably operate. Next, the operation of the clutch device 60 will be described.

Figure 4:
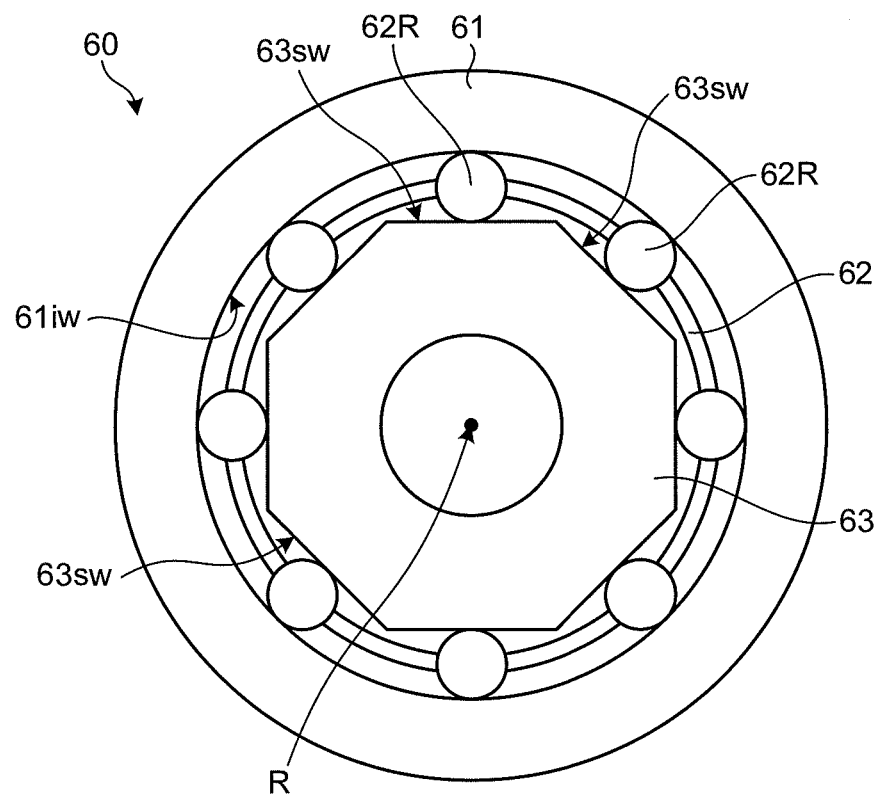
FIG. 4 is a view illustrating the operation of the clutch device.
Figure 5:
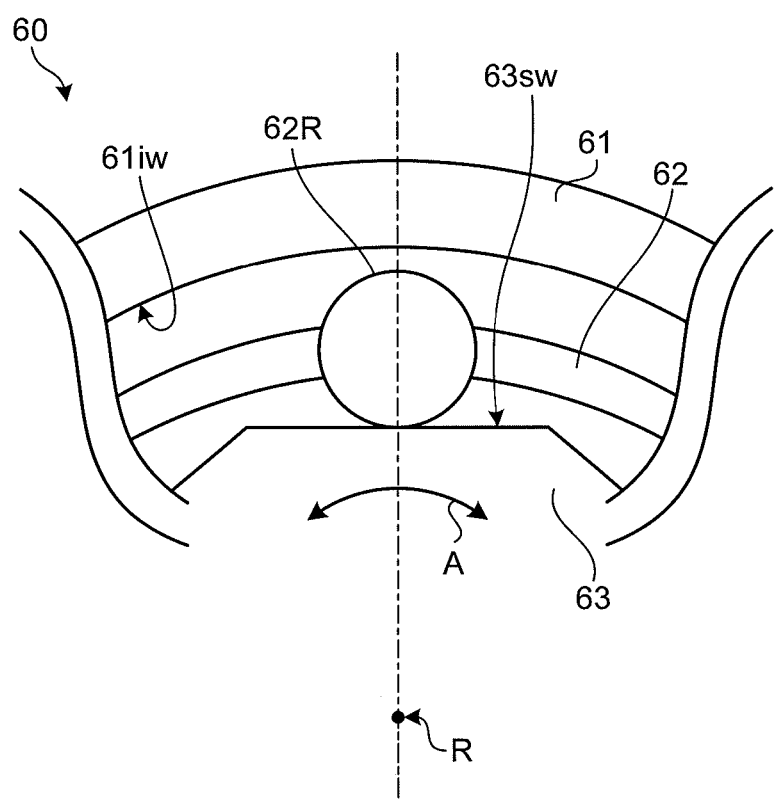
FIG. 5 is a view illustrating the operation of the clutch device.

FIGS. 4 to 7 are views illustrating the operation of the clutch device 60. A part of the clutch device 60 illustrated in FIG. 4 is enlarged and illustrated in FIGS. 5 to 7. The clutch device 60 is simply illustrated in FIGS. 4 to 7 for convenience of description. As illustrated in FIG. 4, the rollers 62R, which are rotatably held by the holder 62 are disposed between an inner peripheral portion 61*iw* of the outer member 61 and the cam faces 63*sw* of the inner member 63. In this embodiment, the holder 62 and the inner member 63 rotate about the rotation axis R of the sun gear shaft 14 and the like. FIG. 5 illustrates a state where the clutch device 60 is in a neutral state. A state where the center of the roller 62R is positioned on the straight line orthogonal to the cam face 63*sw* of the inner member 63 and passing through the rotation axis R is the neutral state of the clutch device 60. In this case, the inner member 63 can rotate about the rotation axis R illustrated in FIG. 5 in both directions (in the directions of an arrow A in FIG. 5).

Figure 6:
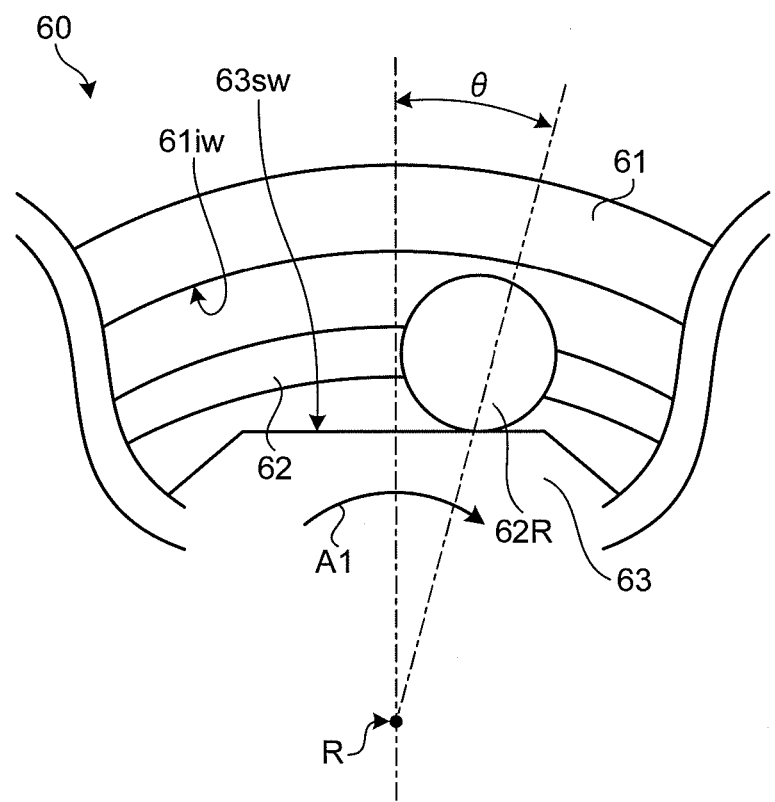
FIG. 6 is a view illustrating the operation of the clutch device.
Figure 7:
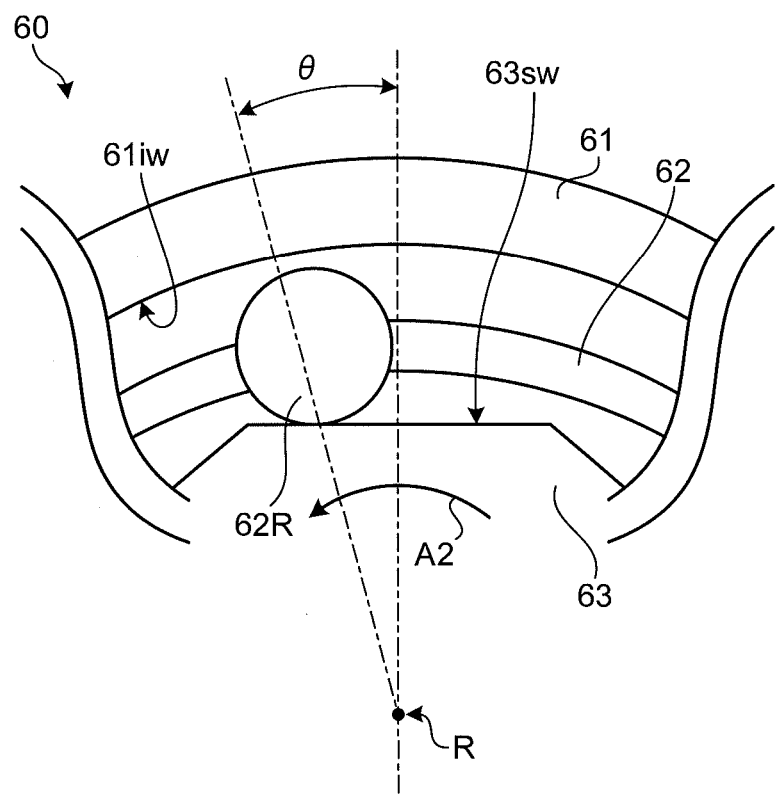
FIG. 7 is a view illustrating the operation of the clutch device.

It is considered the case where the holder 62 is rotated about the rotation axis R as illustrated in FIGS. 6 and 7 by a friction force that is generated between the friction surfaces 64F of the clutch-side frictional engagement members 64 and the sun gear-side frictional engagement portion 14F of the sun gear shaft 14. In this case, the position of the roller 62R is changed from the position of the clutch device 60, which corresponds to the neutral state, by a central angle θ about the rotation axis R. Accordingly, a distance between the inner peripheral portion 61*iw* of the outer member 61 and the cam face 63*sw* of the inner member 63 is reduced, so that the roller 62R is locked between the outer and inner members 61 and 63. In this state, only the rotation of the inner member 63 in the same direction as the rotation direction of the holder 62 is allowed, and the rotation of the inner member 63 in the direction opposite to the rotation direction of the holder 62 is restricted. Only the rotation of the inner member 63 in the direction of an arrow A1 is allowed in an example illustrated in FIG. 6, and only the rotation of the inner member 63 in the direction of an arrow A2 is allowed in an example illustrated in FIG. 7. For this reason, when the holder 62 rotates about the rotation axis R, the clutch device 60 is in the engagement state if the inner member 63 is to rotate in the direction opposite to the rotation direction of the holder 62 and the clutch device 60 is in the disengagement state if the inner member 63 is to rotate in the same direction as the rotation direction of the holder 62.

The clutch device 60 can allow the inner member 63 to rotate only in one direction by changing the attitude of the holder 62 to change the relative phase of the holder 62 relative to the inner member 63, and can allow the inner member 63 not to rotate in the direction opposite to the direction where the inner member 63 can rotate. Further, the clutch device 60 can change the direction where the inner member 63 can rotate and the direction where the inner member 63 cannot rotate, according to the attitude of the holder 62. In this embodiment, the attitude of the holder 62 is changed by the sun gear shaft 14 through the clutch-side frictional engagement members 64 and the sun gear-side frictional engagement portion 14F. Since the sun gear shaft 14 is connected to the first motor 11, it is possible to change the attitude of the holder 62 by the rotation of the first motor 11. Meanwhile, the clutch-side frictional engagement members 64 are engaged with the sun gear-side frictional engagement portion 14F of the sun gear shaft 14, so that the clutch device 60 transmits the rotation direction of the sun gear shaft 14 to the holder 62. That is, the sun gear-side frictional engagement portion 14F functions as an input portion that inputs the rotation direction to the holder 62. Further, since the sun gear shaft 14 is connected to the first sun gear 21, the second sun gear 31, and a rotor of the first motor 11, the sun gear-side frictional engagement portion 14F functions as an input portion for the first sun gear 21, the second sun gear 31, or a rotor of the first motor 11. The clutch-side frictional engagement members 64 are engaged with the input portion for the first sun gear 21, the second sun gear 31, or a rotor of the first motor 11 and the relative phase of the holder 62 relative to the inner member 63 is changed by a friction force generated by the clutch-side frictional engagement members 64 as described above, so that the clutch device 60 switches the allowance (disengagement state) and restriction (engagement state) of the rotation of the first carrier 23. Next, a path along which a rotational force is transmitted in the electric vehicle driving device 10 will be described.

Figure 8:
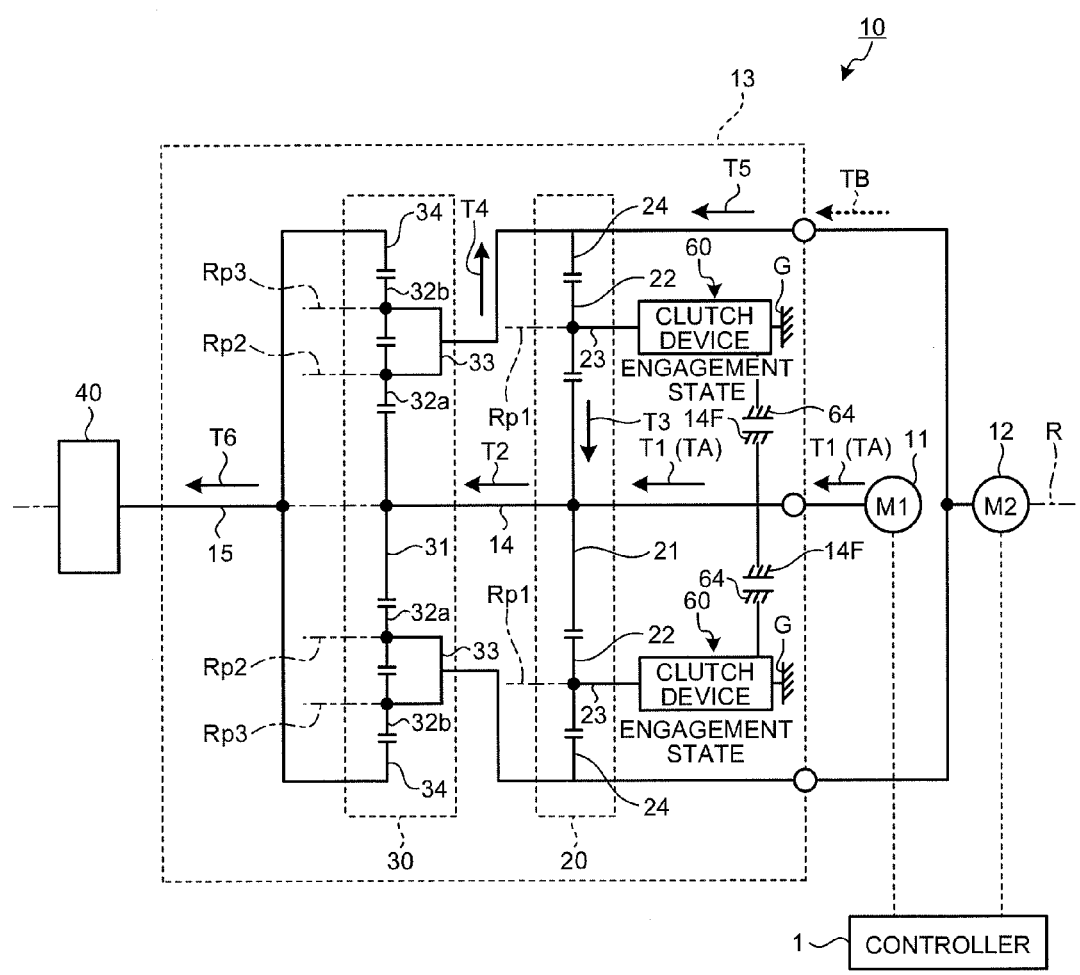
FIG. 8 is a view illustrating a path along which a rotational force is transmitted when the electric vehicle driving device according to this embodiment is in a first speed change state.

FIG. 8 is a view illustrating a path along which rotational force is transmitted when the electric vehicle driving device according to this embodiment is in a first speed change state. The electric vehicle driving device 10 can achieve two speed change states, that is, first and second speed change states. First, a case where the electric vehicle driving device 10 achieves the first speed change state will be described.

The first speed change state is a so-called low gear state in which a high speed reduction ratio can be obtained. That is, the torque of the speed change mechanism-input/output shaft 15 can be increased. The first speed change state is generally used when an electric vehicle requires a large driving force at the time of travel, for example, when an electric vehicle starts on a hill or climbs a hill (goes up a hill), and the like. In the first speed change state, the first and second motors 11 and 12 operate together but the magnitudes of torques generated by the first and second motors 11 and 12 are equal to each other and the directions thereof are opposite to each other. The power of the first motor 11 is input to the first sun gear 21 through the sun gear shaft 14, and the power of the second motor 12 is input to the first ring gear 24. Since the power of the first motor 11 is input to the sun gear shaft 14, the attitude of the holder 62 of the clutch device 60 is changed from the neutral state through the sun gear-side frictional engagement portion 14F and the clutch-side frictional engagement members 64. Since the magnitudes of the torques generated by the first and second motors 11 and 12 are equal to each other and the directions of the torques are opposite to each other, the rotation direction of the holder 62 rotated by the first motor 11 is opposite to the rotation direction of the first carrier 23 rotated by the second motor 12 and the rotation direction of the inner member 63 connected to the first carrier 23. For this reason, in the first speed change state, the clutch device 60 is in the engagement state. That is, in the first speed change state, the first pinion gears 22 cannot rotate relative to the casing G.

In the first speed change state, in the electric vehicle driving device 10, the rotation direction of the sun gear shaft 14, that is, the first and second sun gears 21 and 31 is opposite to a direction in which the first carrier 23 of which the rotation direction is restricted by the clutch device 60 is to rotate. Further, in the electric vehicle driving device 10, the absolute values of the rotational speeds of the first and second sun gears 21 and 31 are larger than the absolute value of the rotational speed of the first carrier 23 of which the rotation direction is restricted by the clutch device 60.

In the first speed change state, a rotational force output from the first motor 11 is referred to as a first rotational force T1 and a rotational force output from the second motor 12 is referred to as a second rotational force T5. Each of the rotational forces, that is, a first rotational force T1, a circulation rotational force T3, a resultant rotational force T2, a first divided rotational force T6, and a second divided rotational force T4 illustrated in FIG. 8 represents torques applied to each portion, and the unit thereof is Nm.

The first rotational force T1 output from the first motor 11 is input to the first sun gear 21. Further, the first rotational force T1 joins the circulation rotational force T3 at the first sun gear 21, so that the resultant rotational force T2 is generated. The resultant rotational force T2 is output from the first sun gear 21. The circulation rotational force T3 is a rotational force that is transmitted to the first sun gear 21 from the first ring gear 24. The detail of the circulation rotational force T3 will be described below.

The first and second sun gears 21 and 31 are connected to each other by the sun gear shaft 14. For this reason, in the first speed change state, the first rotational force T1 is combined with the circulation rotational force T3 and the resultant rotational force T2 output from the first sun gear 21 is transmitted to the second sun gear 31 through the sun gear shaft 14. The resultant rotational force T2 is amplified by the second planetary gear mechanism 30. Further, the resultant rotational force T2 is divided into the first divided rotational force T6 and the second divided rotational force T4 by the second planetary gear mechanism 30. The first divided rotational force T6 is a rotational force that is divided from the resultant rotational force T2 at the second ring gear 34 and amplified, and is output from the speed change mechanism-input/output shaft 15. The second divided rotational force T4 is a rotational force that is divided from the resultant rotational force T2 at the second carrier 33 and amplified.

The first divided rotational force T6 is output to the speed reducing mechanism 40 from the speed change mechanism-input/output shaft 15. Further, the first divided rotational force T6 is amplified at the speed reducing mechanism 40, is output to the vehicle wheel H through the speed reducing mechanism-input/output shaft 16 illustrated in FIG. 1, and drives the vehicle wheel H. As a result, the electric vehicle travels.

Since the second carrier 33 rotates integrally with the first ring gear 24, the second divided rotational force T4 divided at the second carrier 33 forms a circulation rotational force of the first ring gear 24. Moreover, the second divided rotational force T4 is combined with the second rotational force T5 of the second motor 12 at the first ring gear 24, and is transmitted to the first planetary gear mechanism 20. The direction of the second rotational force T5, that is, the rotational force of the second motor 12 is opposite to the direction of the rotational force of the first motor 11.

The magnitudes of the second divided rotational force T4 and the second rotational force T5 of the first ring gear 24, which return to the first planetary gear mechanism 20, are reduced by the first planetary gear mechanism 20; the directions of the second divided rotational force T4 and the second rotational force T5 are reversed; and the second divided rotational force T4 and the second rotational force T5 form the circulation rotational force T3 of the first sun gear 21. Since the circulation of power (rotational force) occurs between the first and second planetary gear mechanisms 20 and 30 in this way, the speed change mechanism 13 can increase a speed reduction ratio. That is, the electric vehicle driving device 10 can generate large torque in the first speed change state. Next, examples of the values of the resultant rotational force T2, the circulation rotational force T3, the second divided rotational force T4, and the first divided rotational force T6 will be described.

The number of teeth of the second sun gear 31 is denoted by Z1, the number of teeth of the second ring gear 34 is denoted by Z4, the number of teeth of the first sun gear 21 is denoted by Z5, and the number of teeth of the first ring gear 24 is denoted by Z7. The rotational forces (the resultant rotational force T2, the circulation rotational force T3, the second divided rotational force T4, and the first divided rotational force T6 illustrated in FIG. 8) applied to the respective portions of the electric vehicle driving device 10 are represented in Expressions (1) to (4). Meanwhile, negative values of the following expressions (1) to (4) mean that the directions of the rotational forces are opposite to the direction of the first rotational force T1.

$$T2 = \frac{\frac{Z7}{Z5}}{\frac{Z7}{Z5} - \frac{Z4}{Z1} + 1} \times T1 - \frac{1}{\frac{Z7}{Z5} - \frac{Z4}{Z1} + 1} \times T5 \qquad (1)$$

$$T3 = \frac{\frac{Z4}{Z1} - 1}{\frac{Z7}{Z5} - \frac{Z4}{Z1} + 1} \times T1 - \frac{1}{\frac{Z7}{Z5} - \frac{Z4}{Z1} + 1} \times T5 \qquad (2)$$

$$T4 = \frac{\frac{Z7}{Z5} \times \left(1 - \frac{Z4}{Z1}\right)}{\frac{Z7}{Z5} - \frac{Z4}{Z1} + 1} \times T1 + \frac{\frac{Z7}{Z5}}{\frac{Z7}{Z5} - \frac{Z4}{Z1} + 1} \times T5 \qquad (3)$$

$$T6 = \frac{\frac{Z7}{Z5} \times \frac{Z7}{Z5}}{\frac{Z7}{Z5} - \frac{Z4}{Z1} + 1} \times T1 - \frac{\frac{Z4}{Z1}}{\frac{Z7}{Z5} - \frac{Z4}{Z1} + 1} \times T5 \qquad (4)$$

As an example, the number Z1 of teeth is set to 47, the number Z4 of teeth is set to 97, the number Z5 of teeth is set to 24, and the number Z7 of teeth is set to 76. Further, the first rotational force T1 is set to 50 Nm and the second rotational force T5 is set to 50 Nm. As a result, the resultant rotational force T2 is 99.1 Nm, the circulation rotational force T3 is 49.1 Nm, the second divided rotational force T4 is −105.4 Nm, and the first divided rotational force T6 is 204.5 Nm. As described above, the electric vehicle driving device 10 amplifies the first rotational force T1, which is output from the first motor 11, fourfold and outputs the amplified first rotational force T1 to the vehicle wheel H. Next, a case where the electric vehicle driving device 10 achieves the second speed change state will be described.

Figure 9:
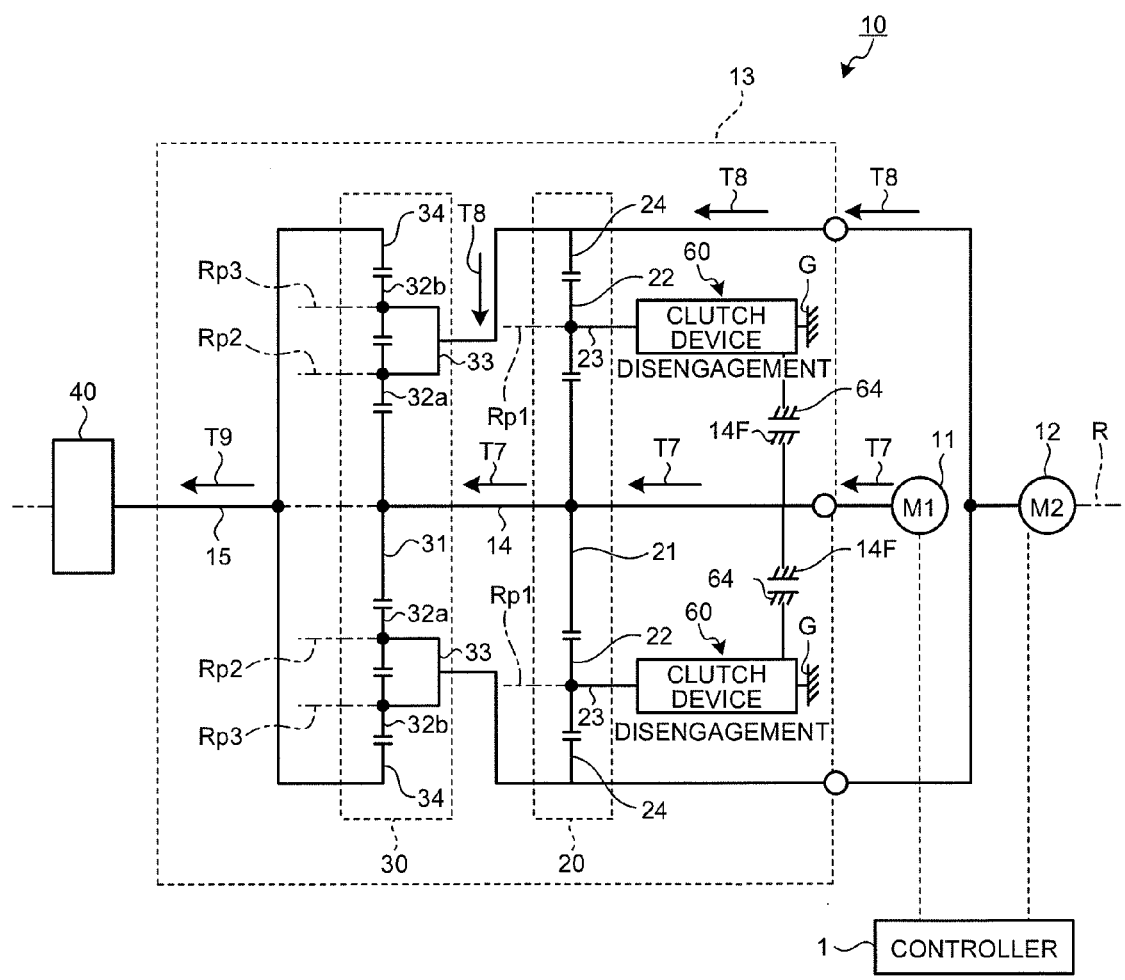
FIG. 9 is a view illustrating a path along which a rotational force is transmitted when the electric vehicle driving device according to this embodiment is in a second speed change state.

FIG. 9 is a view illustrating a path along which a rotational force is transmitted when the electric vehicle driving device according to this embodiment is in the second speed change state. The second speed change state is a so-called high gear state in which a low speed reduction ratio can be obtained. That is, the torque of the speed change mechanism-input/output shaft 15 is reduced, but the friction loss of the speed change mechanism 13 can be reduced. In the second speed change state, the first and second motors 11 and 12 operate together. Further, the torques generated by the first and second motors 11 and 12 have the same magnitude and direction. In the second speed change state, a rotational force output from the first motor 11 is referred to as a first rotational force T7 and a rotational force output from the second motor 12 is referred to as a second rotational force T8.

The power of the first motor 11 is input to the first sun gear 21 through the sun gear shaft 14, and the power of the second motor 12 is input to the first ring gear 24. Since the power of the first motor 11 is input to the sun gear shaft 14, the attitude of the holder 62 of the clutch device 60 is changed from the neutral state through the sun gear-side frictional engagement portion 14F and the clutch-side frictional engagement members 64. Since the torques generated by the first and second motors 11 and 12 have the same magnitude and direction, the rotation direction of the holder 62 rotated by the first motor 11 is the same as the rotation direction of the inner member 63 rotated by the second motor 12 and the rotation direction of the inner member 63 connected to the first carrier 23. For this reason, in the second speed change state, the clutch device 60 is in the disengagement state. In the second speed change state, in the electric vehicle driving device 10, the rotation direction of the sun gear shaft 14, that is, the first and second sun gears 21 and 31 is the same as a direction in which the first carrier 23 of which the rotation direction is restricted by the clutch device 60 is to rotate.

In the second speed change state, the first pinion gears 22 can rotate relative to the casing G. As a result, the circulation of a rotational force between the first and second planetary gear mechanisms 20 and 30 is cut off in the second speed change state. Further, since the first carrier 23 can freely revolve (rotate) in the second speed change state, the first sun gear 21 and the first ring gear 24 can freely rotate relative to each other. Meanwhile, a resultant rotational force T9 illustrated in FIG. 9 is torque that is output from the speed change mechanism-input/output shaft 15 and transmitted to the speed reducing mechanism 40, and the unit thereof is Nm.

In the second speed change state, a ratio between the first rotational force T7 and the second rotational force T8 is determined by a ratio between the number Z1 of teeth of the second sun gear 31 and the number Z4 of teeth of the second ring gear 34. The first rotational force T7 joins the second rotational force T8 at the second carrier 33. As a result, the resultant rotational force T9 is transmitted to the second ring gear 34. The first rotational force T7, the second rotational force T8, and the resultant rotational force T9 satisfy the following expression (5).

$$T9 = T7 + T8 \tag{5}$$

The angular speed (rotational speed) of the speed change mechanism-input/output shaft 15 is determined by the angular speed of the second sun gear 31 that is driven by the first motor 11 and the angular speed of the second carrier 33 that is driven by the second motor 12. Accordingly, even though the angular speed of the speed change mechanism-input/output shaft 15 is constant, it is possible to change the combination of the angular speeds of the first and second motors 11 and 12.

Since the combination of the angular speed of the speed change mechanism-input/output shaft 15, the angular speed of the first motor 11, and the angular speed of the second motor 12 is not uniquely determined as described above, it is possible to continuously shift the state of the speed change mechanism to the second speed change state from the above-mentioned first speed change state or to the first speed change state from the second speed change state. Accordingly, if the controller 1 continuously and smoothly controls the angular speed of the first motor 11, the angular speed of the second motor 12, and the rotational force, it is possible to reduce a so-called shift shock even when the state of the speed change mechanism 13 is changed between the first and second speed change states.

Since the first sun gear 21 and the first ring gear 24 of the speed change mechanism 13 rotate in the same direction, the second sun gear 31 and the second carriers 33 also rotate in the same direction. When the angular speed of the second sun gear 31 is constant, the angular speed of the second ring gear 34 is reduced as the angular speed of the second carrier 33 is increased. Further, as the angular speed of the second carrier 33 is reduced, the angular speed of the second ring gear 34 is increased. In this way, the angular speed of the second ring gear 34 is continuously changed by the angular speed of the second sun gear 31 and the angular speed of the second carrier 33. That is, the electric vehicle driving device 10 can continuously change a transmission gear ratio by changing the angular speed of the second rotational force T8 output from the second motor 12.

Moreover, when the electric vehicle driving device 10 is to make the angular speed of the second ring gear 34 constant, the electric vehicle driving device 10 has a plurality of the combinations of the angular speed of the first rotational force T7 output from the first motor 11 and the angular speed of the second rotational force T8 output from the second motor 12. That is, when the angular speed of the second rotational force T8 output from the second motor 12 is changed, it is possible to maintain the angular speed of the second ring gear 34 constant even though the angular speed of the first rotational force T7 output from the first motor 11 is changed. For this reason, when the electric vehicle driving device 10 is switched to the second speed change state from the first speed change state, the electric vehicle driving device 10 can reduce the variation of the angular speed of the second ring gear 34. As a result, the electric vehicle driving device 10 can reduce a shift shock.

Next, the second rotational force T8 output from the second motor 12 will be described. The second motor 12 needs to output a rotational force that is equal to or larger than the second rotational force T8 satisfying Expression (6). Meanwhile, "$1-(Z4/Z1)$" of Expression (6) means a ratio between the rotational force of the second sun gear 31 and the rotational force of the second ring gear 34.

$$T8 = \left(1 - \frac{Z4}{Z1}\right) \times T7 \tag{6}$$

Accordingly, the first rotational force TA, the second rotational force TB, the number Z1 of teeth, and the number Z4 of teeth need to satisfy the following expression (7) for the purpose of the adjustment of the rotational force and angular speed of the second ring gear 34 when the first motor 11 is arbitrarily rotated. Meanwhile, the first rotational force TA is a rotational force of the first motor 11 at an arbitrary angular speed, and the second rotational force TB is a rotational force of the second motor 12 at an arbitrary angular speed.

$$\frac{TB}{TA} = \left|1 - \frac{Z4}{Z1}\right| \quad (7)$$

As described above, when the first motor 11 outputs a rotational force so as to make an electric vehicle move forward in the first speed change state, that is, in the state where the first and second motors 11 and 12 operate, the clutch device 60 is in the engagement state if the rotation directions of the first and second sun gears 21 and 31 are opposite to the direction in which the first carrier 23 of which the rotation direction is restricted by the clutch device 60 is to rotate. That is, when the second motor 12 is rotated in the direction opposite to the rotation direction of the first motor 11 and the second motor 12 outputs a rotational force of which the direction is opposite to the direction of the rotational force of the first motor 11, the speed change mechanism 13 is in the first speed change state.

Further, when the first motor 11 outputs a rotational force so as to make an electric vehicle move forward in the second speed change state, that is, in the state where the first and second motors 11 and 12 operate, the clutch device 60 is in the disengagement state if the rotation directions of the first and second sun gears 21 and 31 are the same as the rotation direction of the first carrier 23. That is, when the second motor 12 is rotated in the same direction as the rotation direction of the first motor 11 and the second motor 12 outputs a rotational force of which the direction is same as the direction of the rotational force of the first motor 11, the speed change mechanism 13 is in the second speed change state. In this way, the clutch device 60 can passively switch the engagement state and the disengagement state by the direction of the rotational force of the first motor 11 and the direction of the rotational force of the second motor 12.

Since the clutch device 60 is a two-way clutch in this embodiment, the electric vehicle driving device 10 can achieve the first and second speed change states by making the rotation directions and the directions of the rotational forces of the first and second motors 11 and 12 be opposite to those, which correspond to the forward direction, even in the backward direction. For this reason, the electric vehicle driving device 10 can change speed in both the forward and backward directions. Moreover, since the holder 62 of the clutch device 60 is passively operated by the rotation of the first motor 11, the clutch device 60 does not require an actuator in the speed change operation of the electric vehicle driving device 10. Accordingly, the clutch device 60 can reduce the number of parts and reduce its own size (the size of the clutch device 60).

An example where the electric vehicle driving device 10 transmits the power of the first and second motors 11 and 12 to the vehicle wheel H through the speed change mechanism 13 and the speed reducing mechanism 40 and drives the vehicle wheel H has been described in this embodiment. However, the electric vehicle driving device 10 may not include the speed reducing mechanism 40. In this case, the second ring gear 34 of the speed change mechanism 13 is used as an output portion of the speed change mechanism 13 and the second ring gear 34 and the vehicle wheel H are connected to each other so that the vehicle wheel H is driven. Next, an example of the structure of the electric vehicle driving device 10 will be described.

Figure 10:
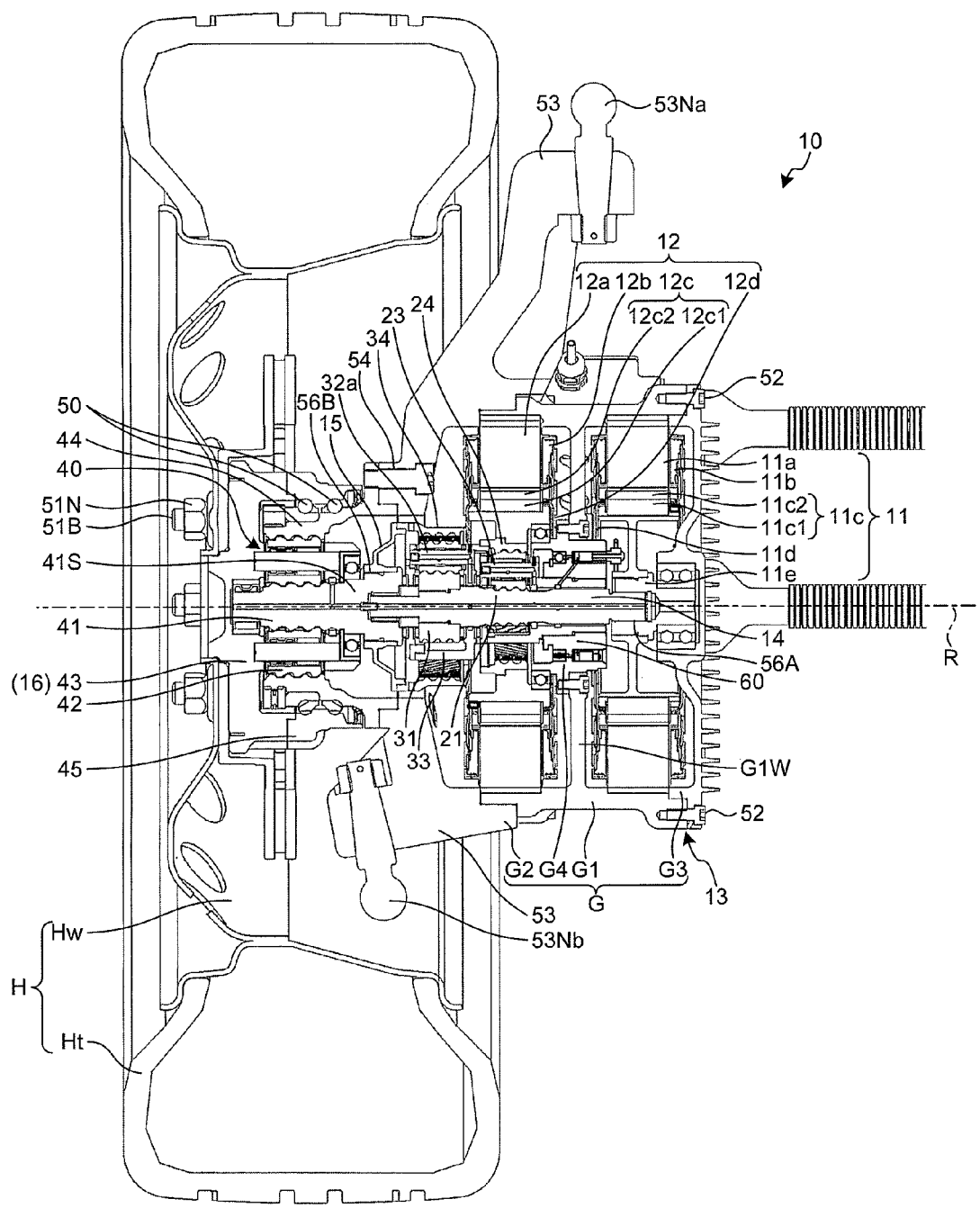
FIG. 10 is a view illustrating the internal structure of the electric vehicle driving device according to this embodiment.

FIG. 10 is a view illustrating the internal structure of the electric vehicle driving device according to this embodiment. In the following description, the repeated description of the above-mentioned components will not be presented and the above-mentioned components will be denoted in FIG. 10 by the same reference numerals. As illustrated in FIG. 10, the casing G includes a first casing G1, a second casing G2, a third casing G3, and a fourth casing G4. The first casing G1, the second casing G2, and the fourth casing G4 are cylindrical members. The second casing G2 is provided closer to the vehicle wheel H than the first casing G1. The first casing G1 and the second casing G2 are fastened to each other by, for example, a plurality of bolts.

The third casing G3 is provided at an open end, which is opposite to the second casing G2, of two open ends of the first casing G1, that is, at an open end, which is close to the body of the electric vehicle, of the first casing G1. The first casing G1 and the third casing G3 are fastened to each other by, for example, a plurality of bolts 52. In this case, the third casing G3 closes the opening of the first casing G1. The fourth casing G4 is provided in the first casing G1. The first casing G1 and the fourth casing G4 are fastened to each other by, for example, a plurality of bolts.

As illustrated in FIG. 10, the first motor 11 includes a first stator core 11a, first coils 11b, a first rotor 11c, a first magnetic pattern ring 11d, and a first motor-output shaft 11e. The first stator core 11a is a cylindrical member. As illustrated in FIG. 10, the first stator core 11a is fitted to the first casing G1 and is positioned (fixed) so as to be interposed between the first casing G1 and the third casing G3. The first coils 11b are provided at a plurality of positions on the first stator core 11a. The first coils 11b are wound on the first stator core 11a with an insulator interposed therebetween.

The first rotor 11c is disposed inside the first stator core 11a in the radial direction. The first rotor 11c includes a first rotor core 11c1 and first magnets 11c2. The first rotor core 11c1 is a cylindrical member. A plurality of first magnets 11c2 are provided in the first rotor core 11c1 or on the outer peripheral portion of the first rotor core 11c1. The first motor-output shaft 11e is a rod-like member. The first motor-output shaft 11e is connected to the first rotor core 11c1. The first magnetic pattern ring 11d is provided on the first rotor core 11c1, and rotates coaxially with the first rotor core 11c1. The first magnetic pattern ring 11d is used to detect the rotation angle of the first rotor core 11c1.

The second motor 12 includes a second stator core 12a, second coils 12b, a second rotor 12c, and a second magnetic pattern ring 12d. The second stator core 12a is a cylindrical member. The second stator core 12a is positioned (fixed) so as to be interposed between the first casing G1 and the second casing G2. The second coils 12b are provided at a plurality of positions on the second stator core 12a. The second coils 12b are wound on the second stator core 12a with an insulator interposed therebetween.

The second rotor 12c is disposed inside the second stator core 12a in the radial direction. The second rotor 12c is supported by the fourth casing G4 so as to be capable of rotating about the rotation axis R together with the clutch device 60. The second rotor 12c includes a second rotor core 12c1 and second magnets 12c2. The second rotor core 12c1 is a cylindrical member. A plurality of second magnets 12c2 are provided in the second rotor core 12c1 or on the outer peripheral portion of the second rotor core 12c1. The second magnetic pattern ring 12d is provided on the second rotor core 12c1, and rotates coaxially with the second rotor core 12c1. The second magnetic pattern ring 12d is used to detect the rotation angle of the second rotor core 12c1.

As illustrated in FIG. 10, the speed reducing mechanism 40 is fastened and mounted to the second casing G2 by, for example, a plurality of bolts 54. In this embodiment, the third ring gear 44 of the speed reducing mechanism 40 is mounted on the second casing G2. An outer race 45 is mounted on one end portion of the third carrier 43 of the speed reducing mechanism 40. Rolling elements of the wheel bearing 50 are interposed between the outer race 45 and the third ring gear 44. By this structure, the third carrier 43 is rotatably supported on the outer peripheral portion of the third ring gear 44 with the outer race 45 interposed therebetween.

A wheel Hw of the vehicle wheel H is mounted on the third carrier 43. The wheel Hw is fastened to the surface of the third carrier 43, which is orthogonal to the rotation axis, by stud bolts 51B and nuts 51N. A tire Ht is mounted on the wheel Hw. The vehicle wheel H of the electric vehicle includes the wheel Hw and the tire Ht. In this example, the vehicle wheel H is directly mounted on the third carrier 43. For this reason, the third carrier 43 also functions as the speed reducing mechanism-input/output shaft 16 illustrated in FIG. 1.

Suspension mounting parts 53 are provided on the second casing G2. Specifically, the Suspension mounting parts 53 are provided on portions of the second casing G2, which correspond to the upper and lower sides in a vertical direction when the electric vehicle driving device 10 is mounted on the body of the electric vehicle. The suspension mounting part 53, which correspond to the upper side in the vertical direction, includes an upper knuckle 53Na and the suspension mounting part 53, which correspond to the lower side in the vertical direction, includes a lower knuckle 53Nb. Arms of the suspension are mounted on the upper and lower knuckles 53Na and 53Nb, and the electric vehicle driving device 10 is supported by the body of the electric vehicle.

The first motor-output shaft 11e and the sun gear shaft 14 are connected to each other by a first fitting portion 56A. By this structure, power is transmitted between the first motor 11 and the sun gear shaft 14. The first fitting portion 56A is formed of, for example, a spline that is formed on the inner peripheral surface of the first motor-output shaft 11e and a spline that is formed on an end portion of the sun gear shaft 14 close to the first motor 11 and fitted to the spline. By this structure, the thermal expansion and the like of the first motor-output shaft 11e and the sun gear shaft 14 in the direction of the rotation axis R are absorbed.

The speed change mechanism-input/output shaft 15 connects the second ring gear 34 of the speed change mechanism 13 with a shaft (a third sun gear shaft 41S) of the third sun gear 41 of the speed reducing mechanism 40. By this structure, power is transmitted between the second planetary gear mechanism 30 of the speed change mechanism 13 and the third sun gear shaft 41S of the speed reducing mechanism 40. The speed change mechanism-input/output shaft 15 and the third sun gear shaft 41S are connected to each other by a second fitting portion 56B. The second fitting portion 56B is formed of, for example, a spline that is formed on the inner peripheral surface of the speed change mechanism-input/output shaft 15 and a spline that is formed on an end portion of the third sun gear shaft 41S close to the second motor 12 and fitted to the spline. By this structure, the thermal expansion and the like of the speed change mechanism-input/output shaft 15 and the third sun gear shaft 41S in the direction of the rotation axis R are absorbed.

According to the above-mentioned structure, the electric vehicle driving device 10 can hold the vehicle wheel H, and can make the electric vehicle travel by transmitting the rotational forces, which are output from the first and second motors 11 and 12, to the vehicle wheel H. Meanwhile, all of the first motor 11, the second motor 12, the first sun gear 21, the first carrier 23, the first ring gear 24, the second sun gear 31, the second carrier 33, the second ring gear 34, the third sun gear 41, the third carrier 43, and the third ring gear 44 are disposed coaxially in this embodiment. However, these components of the electric vehicle driving device 10 may not necessarily be disposed coaxially. Next, the structure, which detects the angular speeds (rotational speeds) of the first and second motors 11 and 12, will be described.

The first and second magnetic pattern rings 11d and 12d are disposed so as to face each other with a partition wall G1W of the casing G1 interposed between the first and second motors 11 and 12. That is, the first and second magnetic pattern rings 11d and 12d face the partition wall G1W.

Figure 11:
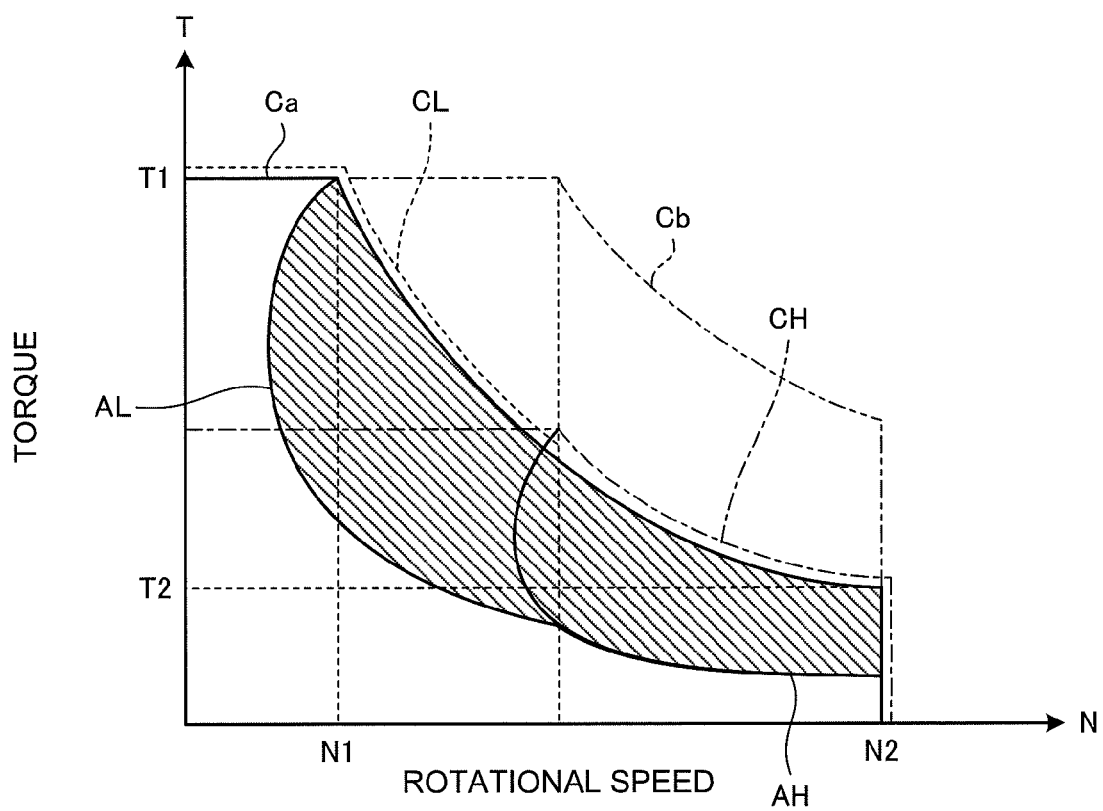
FIG. 11 is a view illustrating a relation between angular speed (rotational speed) and a rotational force (torque) required for a motor that makes a vehicle travel.

FIG. 11 is a view illustrating a relation between angular speed (rotational speed) and a rotational force (torque) required for a motor that makes a vehicle travel. In general, according to a relation between a rotational force (torque) of a motor and the angular speed (rotational speed) of a motor, a ratio of the upper limit of the rotational speed to the maximum rotational speed in an area corresponding to a constant rotational force is about 1:2. Further, a ratio of the maximum rotational force to the maximum rotational force, which corresponds to the maximum rotational speed, is about 2:1. In contrast, when a vehicle is made to travel, a ratio of the upper limit of the rotational speed to the maximum rotational speed in the area corresponding to a constant rotational force is about 1:4 from a vehicle-travel characteristic curve Ca illustrated by a solid line of FIG. 11. Further, when a vehicle is made to travel, a ratio of the maximum rotational force to the maximum rotational force, which corresponds to the maximum rotational speed, is about 4:1

Accordingly, when a vehicle is made to travel by a motor, it is preferable that speed be changed at a ratio (interstage ratio) between a first-stage transmission gear ratio and a second-stage transmission gear ratio is about 2. In this case, it is possible to cover the vehicle-travel characteristic curve Ca without excess and deficiency over the entire area corresponding to the NT characteristics (a relation between rotational speed and a rotational force) of a motor, so that it is possible to ensure power performance, which is required for a vehicle, by a motor having the minimal output.

A NT characteristic curve CL illustrated by a dotted line of FIG. 11 corresponds to the first speed change state (low gear) of the electric vehicle driving device 10, and a NT characteristic curve CH illustrated by a one-dot chain line corresponds to the second speed change state (high gear) of the electric vehicle driving device 10. It is possible to cover the vehicle-travel characteristic curve Ca without excess and deficiency by using the first and second speed change states in this way. A NT characteristic curve Cb illustrated by a two-dot chain line illustrates NT characteristics that are required when the vehicle-travel characteristic curve Ca is to be covered without the change of speed. In general, in regard to a motor, a ratio of the upper limit of the rotational speed to the maximum rotational speed in an area corresponding to a constant rotational force is about 1:2. Accordingly, when the travel characteristic curve Ca is covered by one motor, the motor requires characteristics corresponding to the NT characteristic curve Cb. As a result, since the motor requires excessive performance, a waste is increased and the increase in cost and mass is caused.

When paying attention to the efficiency of a motor, an area in which the efficiency of the motor is high is present at intermediate portions AL and AH of a constant output area (a curved portion of the NT characteristic curve CL or the NT characteristic curve CH) that is shifted to the maximum rotational speed from the maximum rotational force. The electric vehicle driving device 10 can improve efficiency by actively using the intermediate portions AL and AH through the change of speed. When speed is not changed, a motor corresponding to the NT characteristic curve Cb is required. However, in this case, the efficiency of the motor becomes maximum in an area of the travel characteristic curve Ca in which the frequency of use is low (for example, an area in which a large rotational force is required at a low speed or an area which is close to the maximum speed). For this reason, in terms of the efficient use of a motor, it is preferable that the motor be used with the change of a speed reduction ratio like the case of the electric vehicle driving device 10.

When both the first and second motors 11 and 12 operate in the electric vehicle driving device 10, a total speed reduction ratio (RR) of the speed change mechanism 13 satisfies "RR=$(\alpha+\beta-1)/(\alpha-\beta-1)$". This is satisfied only in the first speed change state, and "RR=1" is satisfied in the second speed change state. $\alpha$ denotes the planetary ratio of the second planetary gear mechanism 30, and $\beta$ denotes the planetary ratio of the first planetary gear mechanism 20. A planetary ratio is a value that is obtained by dividing the number of teeth of a ring gear by the number of teeth of a sun gear. Accordingly, the planetary ratio $\alpha$ of the second planetary gear mechanism 30 is obtained from "the number of teeth of the second ring gear 34/the number of teeth of the second sun gear 31" and the planetary ratio $\beta$ of the first planetary gear mechanism 20 is obtained from "the number of teeth of the first ring gear 24/the number of teeth of the first sun gear 21". In order to achieve an interstage ratio of 2, it is preferable that the planetary ratio $\alpha$ of the second planetary gear mechanism 30 (>1) be set in the range of 1.90 to 2.10 and the planetary ratio $\beta$ of the first planetary gear mechanism 20 (>1) be set in the range of 2.80 to 3.20 in the electric vehicle driving device 10 illustrated in FIG. 1.

Since the electric vehicle driving device 10 is disposed below the spring of the electric vehicle, it is preferable that the electric vehicle driving device 10 be as light as possible. In order to reduce the weight of the electric vehicle driving device 10, there is a method of using aluminum (including an aluminum alloy) for the winding wires (first and second coils 11b and 12b) of the first and second motors 11 and 12. Since the specific gravity of aluminum is about 30% of the specific gravity of copper, it is possible to reduce the mass of the winding wires by 70% if aluminum is substituted for copper as the winding wires of the first and second motors 11 and 12. Therefore, it is possible to reduce the weight of the first motor 11, the second motor 12, and the electric vehicle driving device 10. However, since the conductivity of aluminum is about 60% of the conductivity of copper that is generally used for winding wires, there is a concern that performance deterioration and the increase in the amount of generated heat are caused when an aluminum wire is merely substituted for a copper wire.

The electric vehicle driving device 10 uses the speed reducing mechanism 40 and changes a speed reduction ratio by the speed change mechanism 13. Accordingly, since a rotational force required for the first and second motors 11 and 12 is made to be relatively small, current flowing in the first and second motors 11 and 12 is also made to be relatively small. For this reason, even though aluminum wires are used as the first coils 11b of the first motor 11 and the second coils 12b of the second motor 12 instead of copper wires in this embodiment, performance deterioration and the increase in the amount of generated heat hardly occur. Accordingly, in this embodiment, the electric vehicle driving device 10 achieves a reduction in weight by using aluminum (including an aluminum alloy) for the winding wires (the first coils 11b and the second coils 12b) of the first and second motors 11 and 12.

It is preferable that a copper clad aluminum wire be used when aluminum is used for the winding wires of the first and second motors 11 and 12. A copper clad aluminum wire is a wire that is obtained by uniformly coating the outer surface of the aluminum wire with copper and being subjected to metal-binding at the boundary between copper and aluminum. A copper clad aluminum wire is easily soldered as compared to an aluminum wire and also has high reliability between a terminal and a connection portion. Since the specific gravity of a copper clad aluminum is about 40% of the specific gravity of copper, it is possible to reduce the mass of the winding wires by 60% if aluminum is substituted for copper as the winding wires of the first and second motors 11 and 12. As a result, it is possible to reduce the weight of the first motor 11, the second motor 12, and the electric vehicle driving device 10.

(First Modification)

Figure 12:
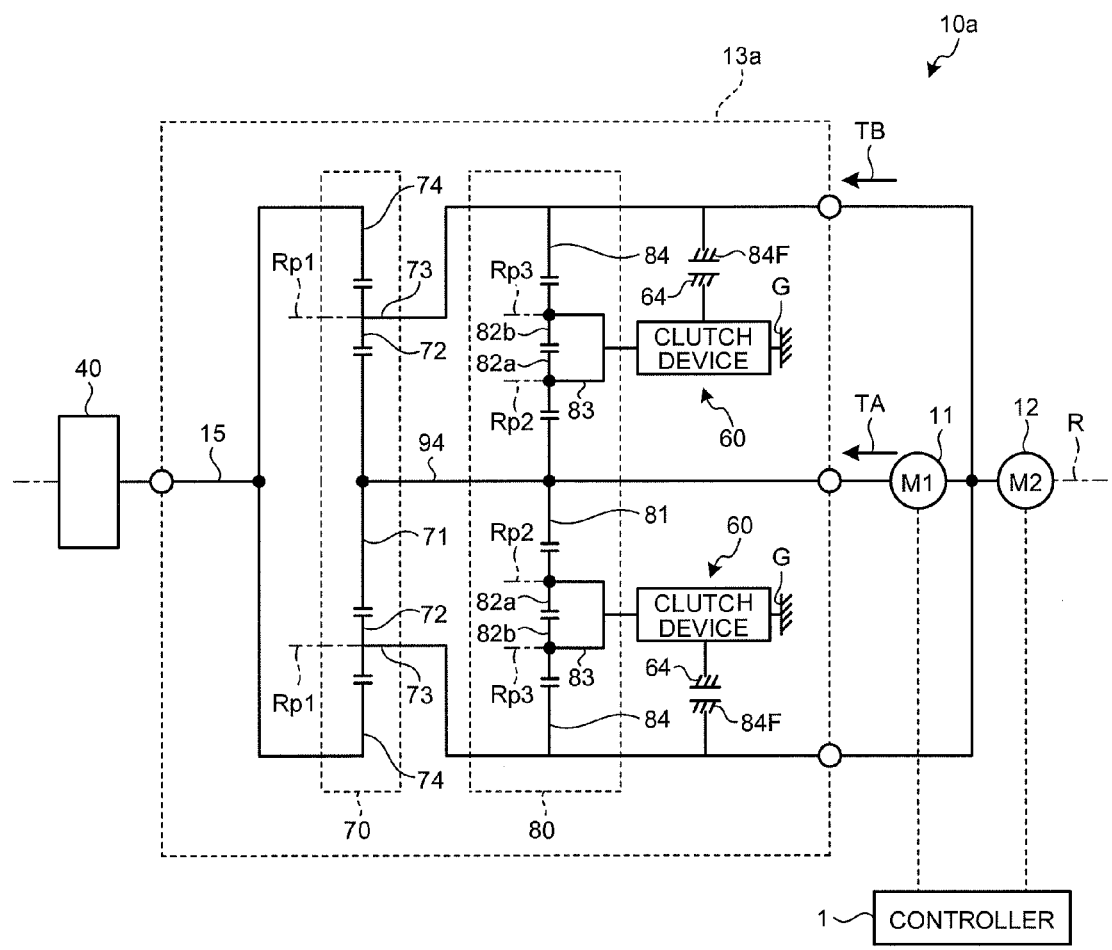
FIG. 12 is a view illustrating the configuration of an electric vehicle driving device according to a first modification of this embodiment.

FIG. 12 is a view illustrating the configuration of an electric vehicle driving device according to a first modification of this embodiment. An electric vehicle driving device 10a illustrated in FIG. 12 is different from the electric vehicle driving device 10 according to the above-mentioned embodiment in terms of the configuration of a speed change mechanism. Hereinafter, the same components as the components of the electric vehicle driving device 10 will be denoted by the same reference numerals and the description thereof will not be presented. The electric vehicle driving device 10a includes a speed change mechanism 13a. The speed change mechanism 13a is connected to a first motor 11, and a rotational force output from the first motor 11 is transmitted (input) to the speed change mechanism 13a. Further, the speed change mechanism 13a is connected to a second motor 12, and a rotational force output from the second motor 12 is transmitted (input) to the speed change mechanism 13a. Furthermore, the speed change mechanism 13a is connected to a speed reducing mechanism 40 by a speed change mechanism-input/output shaft 15, and transmits (outputs) a rotational force, which has been subjected to the change of speed, to the speed reducing mechanism 40. The speed reducing mechanism 40 is the same as the speed reducing mechanism of the electric vehicle driving device 10.

The speed change mechanism 13a includes a first planetary gear mechanism 70, a second planetary gear mechanism 80, and a clutch device 60. The first planetary gear mechanism 70 is a single-pinion type planetary gear mechanism. The first planetary gear mechanism 70 includes a first sun gear 71, first pinion gears 72, first carriers 73, and a first ring gear 74. The second planetary gear mechanism 80 is a double-pinion type planetary gear mechanism. The second planetary gear mechanism 80 includes a second sun gear 81, second pinion gears 82a, third pinion gears 82b, second carriers 83, and a second ring gear 84. The second planetary gear mechanism 80 is disposed closer to the first and second motors 11 and 12 than the first planetary gear mechanism 70.

The second sun gear 81 is supported in a casing G so as to be rotatable about a rotation axis R. The second sun gear 81 is connected to the first motor 11. Accordingly, when the first motor 11 operates, a first rotational force TA is transmitted to the second sun gear 81. Therefore, when the first motor 11 operates, the second sun gear 81 rotates about the rotation axis R. The second pinion gears 82a mesh with the second sun gear 81. The third pinion gears 82b mesh with the second pinion gears 82a. The second carriers 83 hold the second pinion gears 82*a* so that the second pinion gears 82*a* can rotate about second pinion rotation axes Rp2. The second carriers 83 hold the third pinion gears 82*b* so that the third pinion gears 82*b* can rotate about third pinion rotation axes Rp3. The second pinion rotation axes Rp2 are parallel to, for example, the rotation axis R. The third pinion rotation axes Rp3 are parallel to, for example, the rotation axis R.

The second carriers 83 are supported in the casing G so as to be rotatable about the rotation axis R. Accordingly, the second carriers 83 hold the second and third pinion gears 82*a* and 82*b* so that the second and third pinion gears 82*a* and 82*b* can revolve around the second sun gear 81, that is, the rotation axis R. The second ring gear 84 can rotate about the rotation axis R. The second ring gear 84 meshes with the third pinion gears 82*b*. Further, the second ring gear 84 is connected to the second motor 12. Accordingly, when the second motor 12 operates, a second rotational force TB is transmitted to the second ring gear 84. Therefore, when the second motor 12 operates, the second ring gear 84 rotates about the rotation axis R.

The first sun gear 71 is supported in the casing G so as to be rotatable about the rotation axis R. The first sun gear 71 is connected to the first motor 11 through the second sun gear 81. Specifically, the first and second sun gears 71 and 81 are formed integrally with a sun gear shaft 94 so as to be rotatable about the same axis (rotation axis R). Further, the sun gear shaft 94 is connected to the first motor 11. Accordingly, when the first motor 11 operates, the first sun gear 71 rotates about the rotation axis R.

The first pinion gears 72 mesh with the first sun gear 71. The first carriers 73 hold the first pinion gears 72 so that the first pinion gears 72 can rotate about the first pinion rotation axes Rp1. The first pinion rotation axes Rp1 are parallel to, for example, the rotation axis R. The first carriers 73 are supported in the casing G so as to be rotatable about the rotation axis R. Accordingly, the first carriers 73 hold the first pinion gears 72 so that the first pinion gears 72 can revolve around the first sun gear 71, that is, the rotation axis R.

Further, the first carriers 73 are connected to the second ring gear 84. Accordingly, when the second ring gear 84 rotates, the first carriers 73 rotate about rotation axis R. The first ring gear 74 meshes with the first pinion gears 72. Furthermore, the first ring gear 74 is connected to the third sun gear 41 (see FIG. 1) of the speed reducing mechanism 40. By this structure, the third sun gear 41 of the speed reducing mechanism 40 rotates when the first ring gear 74 rotates.

The clutch device 60 is disposed between the casing G and the second carriers 83. The clutch device 60 can restrict the rotation of the second carrier 83 in both directions. Specifically, the clutch device 60 can switch a case where the clutch device 60 restricts (brakes) the rotation of the second carrier 83 about the rotation axis R and a case where the clutch device 60 allows the rotation. The clutch device 60 is a so-called two-way clutch device that can switch an engagement state and a disengagement state in both the rotation directions of the second carrier 83.

The holder 62 of the clutch device 60, which is illustrated in FIGS. 2 to 7, is connected to the second ring gear 84 and the first carrier 73, which is connected to the second ring gear 84, with frictional engagement members (clutch-side frictional engagement members) 64 interposed therebetween. A portion of the second ring gear 84, which comes into contact with the clutch-side frictional engagement members 64, is a ring gear-side frictional engagement portion 84F. The outer member 61 of the clutch device 60 is fixed to the casing G of the electric vehicle driving device 10*a*. The inner member 63 of the clutch device 60, which is illustrated in FIGS. 2 to 7, is mounted on the second carrier 83. Meanwhile, the clutch-side frictional engagement members 64 are engaged with the ring gear-side frictional engagement portion 84F of the second ring gear 84, so that the clutch device 60 transmits the rotation direction of the second ring gear 84 to the holder 62. That is, the ring gear-side frictional engagement portion 84F functions as an input portion that inputs the rotation direction to the holder 62. Further, since the second ring gear 84 is connected to the first carriers 73 and a rotor of the second motor 12, the ring gear-side frictional engagement portion 84F functions as an input portion for the second ring gear 84, the first carriers 73, or the rotor of the second motor 12.

By this structure, the clutch device 60 can switch the engagement state (the restriction of the rotation) and the disengagement state (the allowance of the rotation) of the second carrier 83 based on the rotation of the second ring gear 84 and the first carriers 73. Specifically, the clutch-side frictional engagement members 64 are engaged with the input portion for the second ring gear 84, the first carrier 73, or the rotor of the second motor 12 and the relative phase of the holder 62 relative to the inner member 63 is changed by a friction force generated by the clutch-side frictional engagement members 64, so that the clutch device 60 switches the allowance (disengagement state) and restriction (engagement state) of the rotation of the second carrier 83. Processing (surface roughening, knurling, or the like), which improves a friction force between the ring gear-side frictional engagement portion 84F and the clutch-side frictional engagement members 64, may be performed on the surface of a member connected to the second ring gear 84, and a frictional member may be mounted on the second ring gear 84 or a member connected to the second ring gear 84. In this way, the second carrier 83 can be engaged with and disengaged from the casing G by the clutch device 60. That is, the clutch device 60 can allow the second carrier 83 to rotate relative to the casing G or can allow the second carrier 83 not to rotate relative to the casing G. The electric vehicle driving device 10*a* obtains the same operation and effect as the effect, which is obtained from the electric vehicle driving device 10, by the same principle as the principle of the above-mentioned electric vehicle driving device 10.

(Second Modification)

Figure 13:
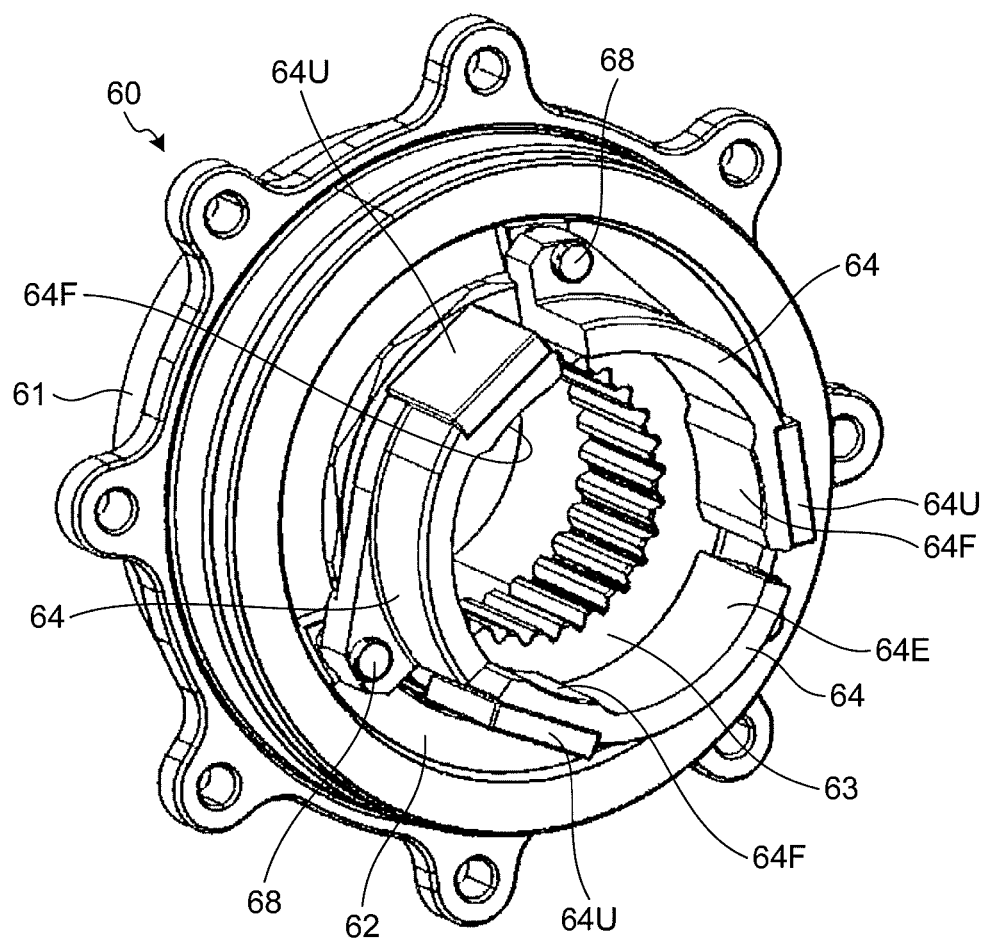
FIG. 13 is a perspective view of a clutch device of an electric vehicle driving device according to a second modification of this embodiment.
Figure 14:
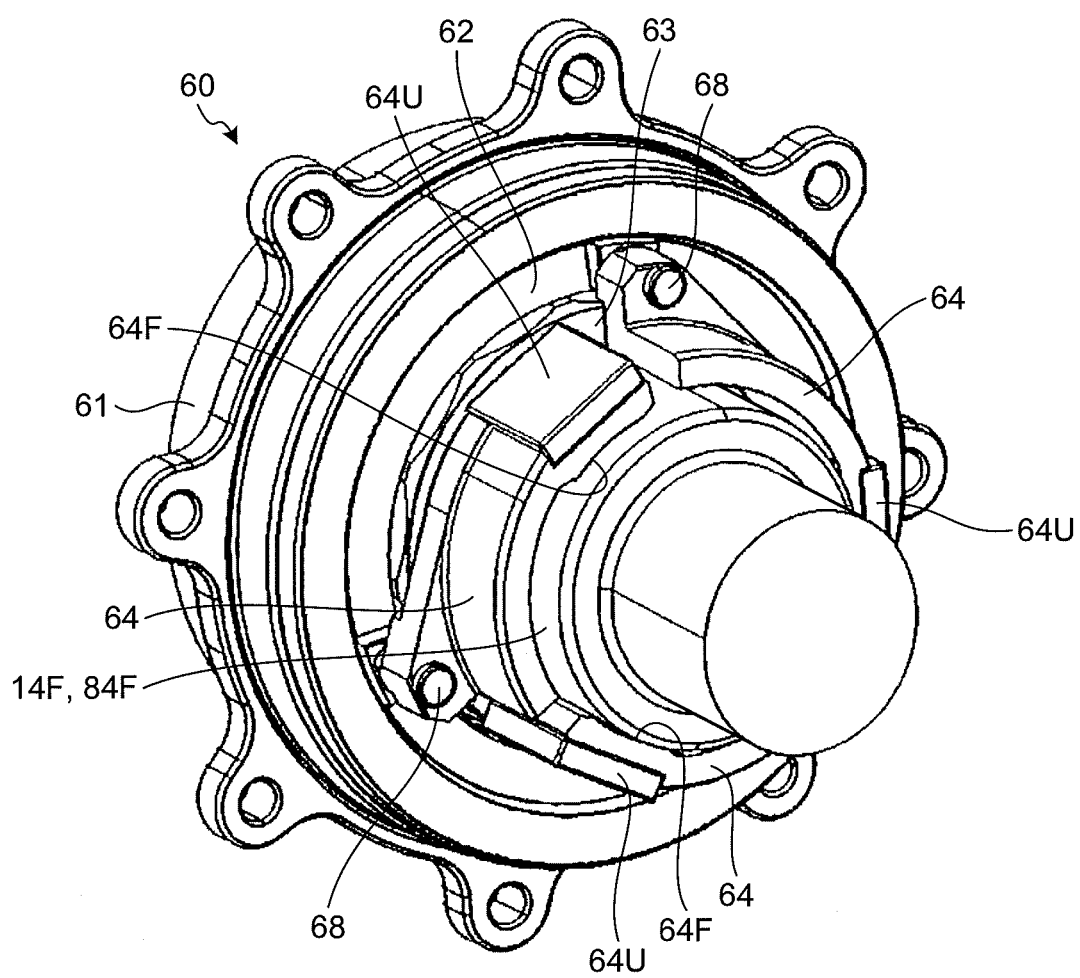
FIG. 14 is a perspective view of the clutch device of the electric vehicle driving device according to the second modification of this embodiment.
Figure 15:
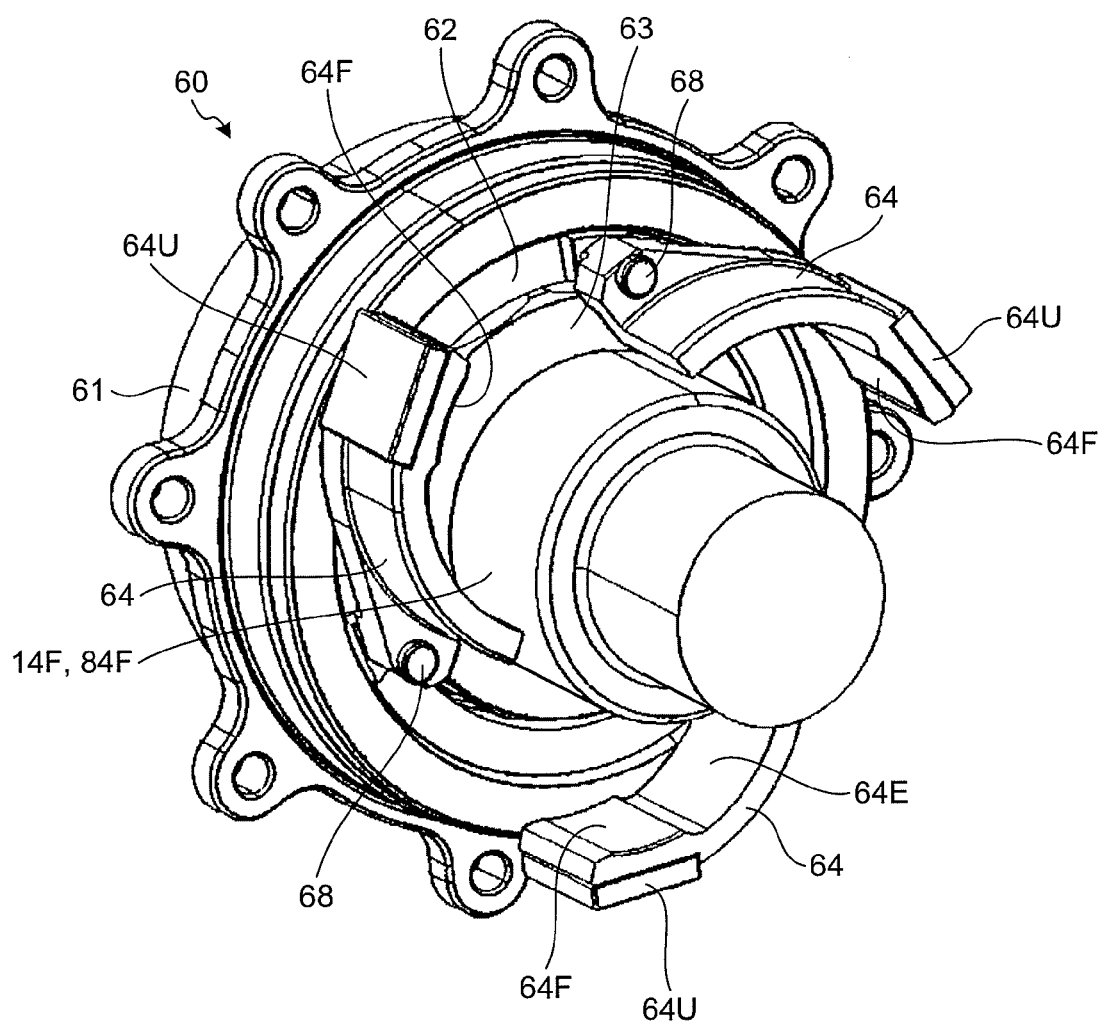
FIG. 15 is a perspective view of the clutch device of the electric vehicle driving device according to the second modification of this embodiment.

FIGS. 13 to 15 are perspective views of a clutch device of an electric vehicle driving device according to a second modification of this embodiment. The clutch device 60 illustrated in FIGS. 13 to 15 is different from the clutch devices of the above-mentioned electric vehicle driving devices 10 and 10*a* in terms of the structure of a clutch-side frictional engagement member 64. Hereinafter, the same components as the components of the clutch devices 60 of the above-mentioned electric vehicle driving devices 10 and 10*a* will be denoted by the same reference numerals and the description thereof will not be presented.

Each of the clutch devices 60 of the above-mentioned electric vehicle driving devices 10 and 10*a* includes the springs 64B as the pressing members, and the friction surfaces 64F of the clutch-side frictional engagement members 64 are pressed against the sun gear-side frictional engagement portion 14F or the ring gear-side frictional engagement portion 84F, which serves as the input portion, by the tension of the spring 64B.

Here, since clutch-side frictional engagement members 64 merely function to transmit the rotation direction of an input portion to the holder 62, that is, to change the attitude of the holder 62, the required transmission torque of the clutch-side frictional engagement members may be small. Further, since the rotation of the holder 62 is stopped in the engagement state of the clutch device 60, the slip occurs between the friction surface 64F of the clutch-side frictional engagement member 64 and the input portion and loss is caused due to a friction force. That is, it is preferable that a friction force generated by the clutch-side frictional engagement members 64 be larger than a force required to generate the transmission torque and reduced as small as possible. Further, it is preferable that a force for pressing the clutch-side frictional engagement members 64 against the input portion not be changed by the secular change of the expansion or the like of the spring 64B.

Accordingly, in this modification, as illustrated in FIGS. 13 to 15, as a pressing member that replaces the spring 64B, permanent magnets 64U are provided on the clutch-side frictional engagement members 64 and the sun gear-side frictional engagement portion 14F or the ring gear-side frictional engagement portion 84F, which is the input portion against which the friction surfaces 64F are pressed, is formed of a magnetic body. The permanent magnet 64U is disposed on the outer surface of the clutch-side frictional engagement member 64 at the portion of the clutch-side frictional engagement member 64 opposite to the friction surface 64F so as not to come into contact with the input portion. Further, the permanent magnet 64U is disposed in the range including the friction surface 64F so that the magnetism of the permanent magnet 64U reaches the friction surface 64F. Furthermore, the clutch-side frictional engagement member 64 is formed of a non-magnetic body, which is not affected by magnetism, so that the magnetism of the permanent magnet 64U does not reach portions other than the friction surface 64F. However, even though the clutch-side frictional engagement member 64 is formed of a non-magnetic body, the thickness of the clutch-side frictional engagement member 64 is set so that the magnetism of the permanent magnet 64U permeates into the friction surface 64F. Moreover, the permanent magnet 64U is appropriately mounted on the clutch-side frictional engagement member 64 by fixing means, such as adhesion or screws.

Since a magnetic attraction force is generated between the permanent magnet 64U and the sun gear-side frictional engagement portion 14F or the ring gear-side frictional engagement portion 84F, which is the input portion, in this clutch device 60, the clutch-side frictional engagement member 64 is pressed against the input portion.

As described above, in the electric vehicle driving devices 10 and 10a of this modification, the clutch device 60 is provided with the permanent magnets 64U on the clutch-side frictional engagement members 64, and the clutch-side frictional engagement members 64 are engaged with the input portion by the magnetic attraction forces of the permanent magnets 64U that act on the input portion formed of a magnetic body.

According to the electric vehicle driving devices 10 and 10a, since the magnetic force of the permanent magnet 64U has high stability against secular change, a stable pressing force is obtained. Accordingly, it is possible to make the clutch-side frictional engagement members 64 be stably engaged with the input portion. Since the friction surface 64F of the clutch-side frictional engagement member 64 comes into contact with the input portion, the friction surface 64F is gradually worn away with the rotation operation of the input portion. However, since the clutch-side frictional engagement member 64 swings due to the magnetic force of the permanent magnet 64U, the clutch-side frictional engagement member 64 swings toward the input portion by an angle, which corresponds to wear, due to the magnetic force of the permanent magnet 64U. As a result, the contact state between the friction surface and the input portion can be maintained.

Further, in the electric vehicle driving devices 10 and 10a of this modification, the clutch-side frictional engagement members 64 are made to swing outward about the pins 68 and the input portion only has to be inserted inside the clutch-side frictional engagement members 64 when the sun gear-side frictional engagement portion 14F or the ring gear-side frictional engagement portion 84F, which is the input portion, is assembled with the clutch device 60. Accordingly, it is possible to easily assemble the clutch device 60 without a working for inserting an input portion while expanding the spring 64B unlike in the clutch device 60 using the spring 64B.

This embodiment and the first and second modifications thereof have been described above, but this embodiment and the first and second modifications thereof are not limited to the above description. Further, components that can be easily supposed by those skilled in the art and substantially the same components, that is, so-called equivalent components are included in the above-mentioned components. Furthermore, the above-mentioned components may be appropriately combined with each other. Moreover, various omissions, substitutions, and modifications may be made without departing from the scope of the inventions of this embodiment and the first and second modifications thereof.

| Reference Signs List | |
| --- | --- |
| 1 | CONTROLLER |
| 10, 10a | ELECTRIC VEHICLE DRIVING DEVICE |
| 11 | FIRST MOTOR |
| 12 | SECOND MOTOR |
| 13, 13a | SPEED CHANGE MECHANISM |
| 14, 94 | SUN GEAR SHAFT |
| 14F | SUN GEAR-SIDE FRICTIONAL ENGAGEMENT PORTION |
| 15 | SPEED CHANGE MECHANISM-INPUT/OUTPUT SHAFT |
| 16 | SPEED REDUCING MECHANISM-INPUT/OUTPUT SHAFT |
| 20, 70 | FIRST PLANETARY GEAR MECHANISM |
| 21, 71 | FIRST SUN GEAR |
| 22, 72 | FIRST PINION GEAR |
| 23, 73 | FIRST CARRIER |
| 24, 74 | FIRST RING GEAR |
| 30, 80 | SECOND PLANETARY GEAR MECHANISM |
| 31, 81 | SECOND SUN GEAR |
| 32a, 82a | SECOND PINION GEAR |
| 32b, 82b | THIRD PINION GEAR |
| 33, 83 | SECOND CARRIER |
| 34, 84 | SECOND RING GEAR |
| 40 | SPEED REDUCING MECHANISM |
| 41 | THIRD SUN GEAR |
| 41S | THIRD SUN GEAR SHAFT |
| 42 | FOURTH PINION GEAR |
| 43 | THIRD CARRIER |
| 44 | THIRD RING GEAR |
| 45 | OUTER RACE |
| 60 | CLUTCH DEVICE |
| 61 | OUTER MEMBER |
| 61iw | INNER PERIPHERAL PORTION |
| 62 | HOLDER |
| 62R | ROLLER |
| 63 | INNER MEMBER |
| 63sw | CAM FACE |
| 63S | GROOVE |
| 64 | CLUTCH-SIDE FRICTIONAL ENGAGEMENT MEMBER |
| 64B | SPRING |
| 64E | ESCAPE PORTION |
| 64F | FRICTION SURFACE |
| 64S | GROOVE |
| 64U | PERMANENT MAGNET |

| | Reference Signs List |
|---|---|
| 65 | BEARING |
| 68 | PIN |
| 84F | RING GEAR-SIDE FRICTIONAL ENGAGEMENT PORTION |

The invention claimed is:

1. An in-wheel motor comprising:
a first motor;
a second motor;
a first sun gear connected to the first motor;
a first pinion gear that meshes with the first sun gear;
a first carrier for holding the first pinion gear so that the first pinion gear rotates and the first pinion gear revolves around the first sun gear;
a clutch device for restricting a rotation of the first carrier in a direction corresponding to a rotation direction of the first motor;
a first ring gear that meshes with the first pinion gear and is connected to the second motor;
a second sun gear connected to the first motor;
a second pinion gear that meshes with the second sun gear;
a third pinion gear that meshes with the second pinion gear;
a second carrier for holding the second and third pinion gears so that the second and third pinion gears rotate, respectively, and the second and third pinion gears revolve around the second sun gear, the second carrier being connected to the first ring gear; and
a second ring gear that meshes with the third pinion gear,
wherein the in-wheel motor operates so as to switch between a first speed change state and a second speed change state,
in the first speed change state, rotation directions of the first and second sun gears are opposite to the direction of the rotation of the first carrier restricted by the clutch device and absolute values of rotational speeds of the first and second sun gears are larger than an absolute value of a rotational speed of the first carrier of which the rotation is restricted by the clutch device, and
in the second speed change state, the rotation directions of the first and second sun gears are the same as the direction of the rotation of the first carrier restricted by the clutch device.

2. The in-wheel motor according to claim 1, further comprising:
a speed reducing mechanism including:
a third sun gear connected to the second ring gear;
a fourth pinion gear that meshes with the third sun gear;
a third carrier for holding the fourth pinion gear so that the fourth pinion gear rotates and the fourth pinion gear revolves around the third sun gear, the third carrier being connected to a vehicle wheel of an electric vehicle; and
a third ring gear that meshes with the fourth pinion gear and is fixed to a static system.

3. The in-wheel motor according to claim 1,
wherein the clutch device is configured to restrict the rotation of the first carrier in the first speed change state, and allow the rotation of the first carrier in the second speed change state.

4. The in-wheel motor according to claim 3,
wherein the clutch device includes:
an outer member that is fixed to a static system;
an inner member that is connected to the first carrier;
a plurality of rollers; and
a holder for holding the plurality of rollers, and
wherein a frictional engagement member of the holder is engaged with an input portion for either one of the first sun gear, the second sun gear or a rotor of the first motor, and a relative phase of the holder relative to the inner member is changed by a friction force generated by the frictional engagement member, so that the clutch device switches the allowance and restriction of the rotation of the first carrier.

5. The in-wheel motor according to claim 4,
wherein the clutch device is provided with a permanent magnet on the frictional engagement member, and the frictional engagement member is engaged with the input portion by a magnetic attraction force of the permanent magnet that acts on the input portion, the input portion being formed of a magnetic body.

6. The in-wheel motor according to claim 1,
wherein when a planetary ratio of a double-pinion planetary gear device, which includes the second sun gear, the second pinion gear, the third pinion gear, the second carrier, and the second ring gear, is denoted by $\alpha$ and a planetary ratio of a single-pinion planetary gear device, which includes the first sun gear, the first pinion gear, the first carrier, and the first ring gear, is denoted by $\beta$, $1.90 \leq \alpha \leq 2.10$ and $2.80 \leq \beta \leq 3.20$ are satisfied.

* * * * *